US012342169B2

(12) United States Patent
Maeda et al.

(10) Patent No.: US 12,342,169 B2
(45) Date of Patent: Jun. 24, 2025

(54) UNAUTHORIZED COMMUNICATION DETECTION METHOD, UNAUTHORIZED COMMUNICATION DETECTION DEVICE, AND RECORDING MEDIUM

(71) Applicant: Panasonic Intellectual Property Corporation of America, Torrance, CA (US)

(72) Inventors: Manabu Maeda, Osaka (JP); Tomoyuki Haga, Nara (JP); Yuji Unagami, Osaka (JP); Naohisa Nishida, Osaka (JP); Masashi Hisai, Osaka (JP); Hitoshi Tahara, Kyoto (JP); Kenji Harada, Osaka (JP); Takashi Kurano, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 141 days.

(21) Appl. No.: 17/849,273

(22) Filed: Jun. 24, 2022

(65) Prior Publication Data

US 2022/0338013 A1    Oct. 20, 2022

Related U.S. Application Data

(63) Continuation of application No. PCT/JP2021/008006, filed on Mar. 2, 2021.

(30) Foreign Application Priority Data

Mar. 4, 2020    (JP) ................................ 2020-036571

(51) Int. Cl.
*H04W 12/121*    (2021.01)

(52) U.S. Cl.
CPC ................................ *H04W 12/121* (2021.01)

(58) Field of Classification Search
CPC .................................................... H04W 12/121
See application file for complete search history.

(56) References Cited

U.S. PATENT DOCUMENTS

| 2006/0059552 A1 | 3/2006 | Aoki et al. |
| 2009/0007254 A1 | 1/2009 | Aoki et al. |

(Continued)

FOREIGN PATENT DOCUMENTS

| EP | 2955815 | 12/2015 |
| EP | 3410644 | 12/2018 |

(Continued)

OTHER PUBLICATIONS

Extended European Search Report (EESR) from European Patent Office (EPO) in European Patent Appl. No. 21763770.1, dated Jul. 20, 2023.

(Continued)

*Primary Examiner* — Simon P Kanaan
(74) *Attorney, Agent, or Firm* — Greenblum & Bernstein, P.L.C.

(57) ABSTRACT

An unauthorized communication detection method detects an unauthorized communication message on an in-facility network over which at least two devices including a first device and a second device are communicably connected, and includes: receiving, from the first device, a communication message transmitted from the first device to the second device; obtaining, when the communication message is received from the first device, first information indicating a state of at least one of (a) a person in a facility and (b) the at least two devices, and determining whether to execute processing pertaining to a device control command that controls the second device when the communication message received from the first device is a communication message including the device control command, the determining being performed based on the first information; and (Continued)

executing the processing pertaining to the device control command when the determining determines to execute the processing.

18 Claims, 30 Drawing Sheets

(56) References Cited

U.S. PATENT DOCUMENTS

| | | |
|---|---|---|
| 2015/0168930 A1 | 6/2015 | Nakano et al. |
| 2015/0180880 A1 | 6/2015 | Nakano et al. |
| 2018/0348718 A1 | 12/2018 | Richardson et al. |
| 2021/0250765 A1* | 8/2021 | Vargas .................. H04W 12/71 |
| 2021/0341888 A1* | 11/2021 | Richardson ............ G08B 21/22 |
| 2022/0417051 A1* | 12/2022 | Reul ................... H04L 12/2818 |

FOREIGN PATENT DOCUMENTS

| | | |
|---|---|---|
| JP | 2006-203516 | 8/2006 |
| JP | 4082613 | 4/2008 |
| WO | 2014/024428 | 2/2014 |

OTHER PUBLICATIONS

International Search Report (ISR) from International Searching Authority (Japan Patent Office) in International Pat. Appl. No. PCT/JP2021/008006, dated Jun. 1, 2021, together with an English language translation.

* cited by examiner

FIG. 3

| Device No. 1 (Air conditioner) | Device No. 2 (Lighting) | Device No. 3 (Electric lock) | . . . | Resident |
|---|---|---|---|---|
| OFF | ON | Lock | | Bedroom |

FIG. 4

| Device No. 3 Determine whether to unlock electric lock | Device No. 1 (Air conditioner) | Device No. 2 (Lighting) | Resident |
|---|---|---|---|
| NG | ON | ON | 2F |
| OK | ON | OFF | 1F |
| NG | OFF | OFF | Away |
| NG | OFF | ON | Bedroom |

| No. | Identifier (MAC address) | Device type |
|-----|--------------------------|-------------|
| 1 | ww:ww:ww:ww:ww:ww | Appliance |
| 2 | xx:xx:xx:xx:xx:xx | Appliance |
| 3 | yy:yy:yy:yy:yy:yy | Appliance |
| 4 | zz:zz:zz:zz:zz:zz | Non-appliance |

FIG. 10

| Mode | Device No. 3 Determine whether to unlock electric lock |
|---|---|
| Active mode | OK |
| Non-active mode | NG |
| Away mode | NG |

FIG. 11

| Mode | Device No. 1 (Air conditioner) | Device No. 2 (Lighting) | Device No. 3 (Electric lock) | Resident |
|---|---|---|---|---|
| Active mode | ON | ON | Lock | Kitchen |
| Non-active mode | ON | OFF | Lock | Bedroom |
| Away mode | - | OFF | Lock | Away |

FIG. 12

| Mode | Command allowed/not allowed | |
|---|---|---|
| | Unlock command | Control command (aside from unlock command) |
| Active mode | O | O |
| Non-active mode | × | O |
| Away mode | × | × |

FIG. 13

| Mode | State of house/people | |
|---|---|---|
| | Resident moving/still | Resident present/away |
| Active mode | Moving | Present |
| Non-active mode | Still | Present |
| Away mode | - | Away |

FIG. 26

| State No. | Device No. 1 (Air conditioner) | Device No. 2 (Lighting) | Resident | Unlocking electric lock |
|---|---|---|---|---|
| Now | OFF | ON | 1F | — |
| 1 | ON | ON | 2F | NG |
| 2 | ON | OFF | 1F | OK |
| 3 | — | — | Away | NG |
| 4 | OFF | ON | Bedroom | NG |
| ... | ... | ... | ... | ... |

FIG. 27

|  | Resident present/ away or moving/still | Control command |
|---|---|---|
| Active mode | Present or moving | ○ |
| Away mode | Away or still | × |

FIG. 28

| Mode | State of house/people | | |
|---|---|---|---|
| | Resident moving/still | Resident present/away | Resident in entrance only |
| Active mode | Moving | Present | × |
| Non-active mode | Still | Present | × |
| Entrance mode | — | — | ○ |
| Away mode | Still | Away | × |
| Housesitting mode | Moving | Away | × |

FIG. 29

| Mode | Command allowed/not allowed | | |
|---|---|---|---|
| | Unlock command (Terminal not in entrance) | Unlock command (Terminal in entrance) | Control command (Aside from unlock command) |
| Active mode | ○ | ○ | ○ |
| Non-active mode | × | × | ○ |
| Entrance mode | × | ○ | × |
| Away mode | × | × | × |
| Housesitting mode | × | × | ○ |

UNAUTHORIZED COMMUNICATION DETECTION METHOD, UNAUTHORIZED COMMUNICATION DETECTION DEVICE, AND RECORDING MEDIUM

CROSS REFERENCE TO RELATED APPLICATIONS

This is a continuation application of PCT International Application No. PCT/JP2021/008006 filed on Mar. 2, 2021, designating the United States of America, which is based on and claims priority of Japanese Patent Application No. 2020-036571 filed on Mar. 4, 2020. The entire disclosures of the above-identified applications, including the specifications, drawings and claims are incorporated herein by reference in their entirety.

FIELD

The present disclosure relates to an unauthorized communication detection method, an unauthorized communication detection device, and a recording medium.

BACKGROUND

In recent years, devices such as electronic control units in vehicles, appliances in homes, equipment in buildings, equipment in stores, and manufacturing devices in factories have begun to be connected to local networks in vehicles or buildings and to the Internet through routers and the like. Functions such as remote control, status monitoring, and linking of devices in a building are realized by connecting these devices to the Internet. However, cyberattacks targeting such connected devices are occurring. In modern cyberattacks, routers, personal computers, and smartphones are being hijacked and forced to participate in attacks on other servers on the Internet. Furthermore, the fact that routers, personal computers, and smartphones can be hijacked means that an attacker can also attack devices in a car or a building.

The method disclosed in Patent Literature (PTL) 1 is an example of a security measure against attacks on devices connected to a network that is restricted to a certain space, such as in a car or a building (a Local Area Network (LAN) or the like). According to the method of PTL 1, it is possible to restrict communication between devices at any desired time by having a countermeasure device determine whether packets are passed or discarded in communication that is completed within a network in a car or building. This makes it possible, for example, to restrict certain communication services in a network.

CITATION LIST

Patent Literature

PTL 1: Japanese Patent No. 4082613

SUMMARY

Technical Problem

However, the method disclosed in PTL 1 requires an administrator to input data serving as criteria for determining whether packets are passed or discarded (restriction criteria) into the countermeasure device, and thus in a network without an administrator, the network may not be protected because data serving as the determination criteria cannot be input. Additionally, even if an administrator is present, it may not be possible to protect the network until the data serving as the determination criteria is input by the administrator. In other words, there is room for improvement in security measures against attacks on devices.

To solve the above-described problem, the present disclosure provides an unauthorized communication detection method, an unauthorized communication detection device, and a recording medium with improved security measures.

Solution to Problem

An unauthorized communication detection method according to one aspect of the present disclosure is an unauthorized communication detection method that detects an unauthorized communication message on an in-facility network over which at least two devices including a first device and a second device are communicably connected to each other. The unauthorized communication detection method includes: receiving, from the first device, a communication message transmitted from the first device to the second device; obtaining, when the communication message is received from the first device, first information indicating a state of at least one of (a) a person in a facility in which the in-facility network is provided and (b) the at least two devices; determining whether to execute processing pertaining to a device control command that controls the second device when the communication message received from the first device is a communication message including the device control command, the determining being performed based on the first information; and executing the processing pertaining to the device control command when the determining determines to execute the processing.

An unauthorized communication detection device according to one aspect of the present disclosure is an unauthorized communication detection device that detects an unauthorized communication message on an in-facility network over which at least two devices including a first device and a second device are communicably connected to each other. The unauthorized communication detection device includes: a receiver that receives, from the first device, a communication message transmitted from the first device to the second device; an obtainer that, when the communication message is received from the first device, obtains first information indicating a state of at least one of (a) a person in a facility in which the in-facility network is provided and (b) the at least two devices; a determiner that, based on the first information, determines whether to execute processing pertaining to a device control command that controls the second device when the communication message received from the first device is a communication message including the device control command; and an executer that executes the processing pertaining to the device control command when the processing is determined to be executed by the determiner.

A recording medium according to one aspect of the present disclosure is a non-transitory computer-readable recording medium recorded thereon a program that causes a computer to execute the above-described unauthorized communication detection method.

Advantageous Effects

According to one aspect of the present disclosure, an unauthorized communication detection method and the like having improved security measures can be provided.

BRIEF DESCRIPTION OF DRAWINGS

These and other advantages and features will become apparent from the following description thereof taken in conjunction with the accompanying Drawings, by way of non-limiting examples of embodiments disclosed herein.

FIG. 3 is a diagram illustrating an example of a state list according to Embodiment 1.

FIG. 4 is a diagram illustrating an example of a determination list according to Embodiment 1.

FIG. 10 is a diagram illustrating an example of a determination list according to Embodiment 2.

FIG. 11 is a diagram illustrating an example of a mode determination list according to Embodiment 2.

FIG. 12 is a diagram illustrating another example of a determination list according to Embodiment 2.

FIG. 13 is a diagram illustrating another example of a mode determination list according to Embodiment 2.

FIG. 26 is a diagram illustrating an example of a determination list according to Variation 7.

FIG. 27 is a diagram illustrating another example of a determination list according to Variation 8.

FIG. 28 is a diagram illustrating an example of a mode determination list according to Variation 9.

FIG. 29 is a diagram illustrating yet another example of a determination list according to Variation 9.

DESCRIPTION OF EMBODIMENTS

Figure 1:
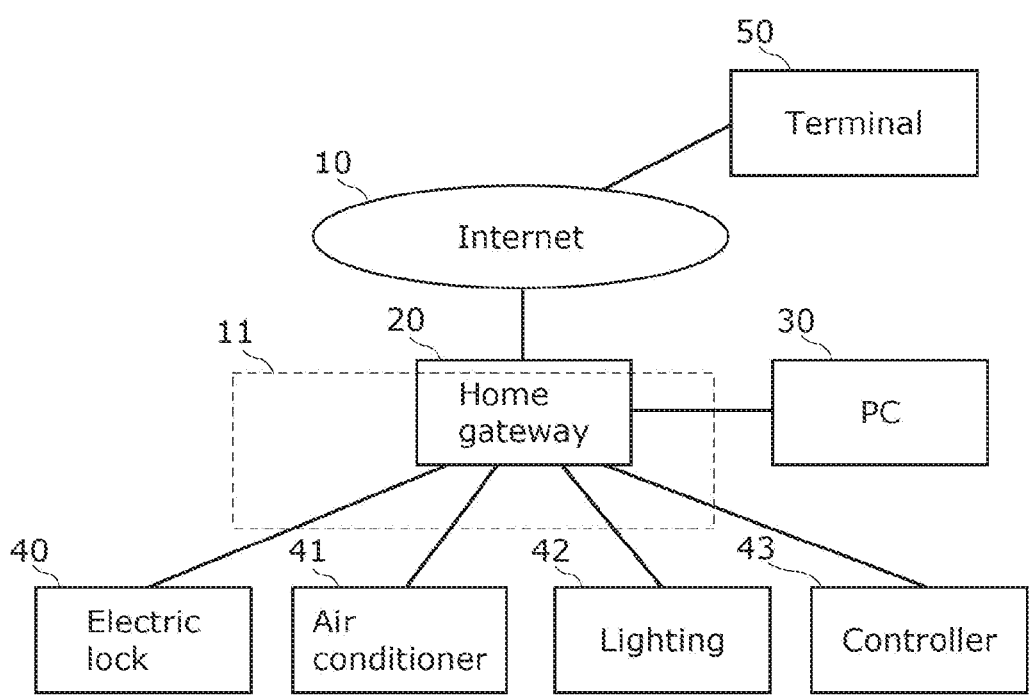
FIG. 1 is a diagram of the overall configuration of an unauthorized communication detection system according to Embodiment 1.

An unauthorized communication detection method according to one aspect of the present disclosure is an unauthorized communication detection method that detects an unauthorized communication message on an in-facility network over which at least two devices including a first device and a second device are communicably connected to each other. The unauthorized communication detection method includes: receiving, from the first device, a communication message transmitted from the first device to the second device; obtaining, when the communication message is received from the first device, first information indicating a state of at least one of (a) a person in a facility in which the in-facility network is provided and (b) the at least two devices; determining whether to execute processing pertaining to a device control command that controls the second device when the communication message received from the first device is a communication message including the device control command, the determining being performed based on the first information; and executing the processing pertaining to the device control command when the determining determines to execute the processing.

Through this, based on the state of at least one of a person in a facility in which the in-facility network is provided and the at least two devices, a situation where the processing pertaining to a device control command that is difficult to transmit in the stated state is executed can be suppressed. For example, it is possible to detect an unauthorized communication message that cannot be detected when it is determined to execute processing based on a communication message including a device control command. Thus, according to one aspect of the present disclosure, security measures can be improved.

Additionally, for example, the in-facility network may further include a relay device that relays the communication message that is transmitted and received between the at least two devices, the relay device executing the unauthorized communication detection method; the processing pertaining to the device control command may be processing of transmitting the communication message including the device control command to the second device; the determining may include, as the determining of whether to execute the processing pertaining to the device control command, determining whether to transmit the communication message including the device control command to the second device; and the executing may include transmitting the communication message to the second device as the executing of the processing.

Through this, situations where an unauthorized communication message is transmitted to the second device can be suppressed. In other words, situations where unauthorized control is performed by the second device can be suppressed.

Additionally, for example, the first information may include the state of a person in the facility, and the determining may include determining to transmit the communication message including the device control command to the second device when, based on the first information, it is determined that a person is present in the facility, and determining to not transmit the communication message including the device control command to the second device when, based on the first information, it is determined that a person is not present in the facility.

Through this, situations where a communication message including a device control command that would not normally occur in the state of a person is transmitted to the second device can be suppressed. This also makes it possible to determine whether to transmit the communication message to the second device simply by obtaining the state of the person.

Additionally, for example, the second device may be installed in an entrance of the facility, and the determining may further include determining to transmit the communication message including the device control command to the second device when, based on the first information, it is determined that a person is present only near the entrance of the facility.

Through this, a situation in which a communication message is transmitted to a device not at the entrance when a person is near the entrance can be suppressed. For example, a situation where a communication message which is highly likely to be an unauthorized communication message, such as lighting within the facility turning on when a person leaves, is transmitted to the second device can be suppressed.

Additionally, or example, the unauthorized communication detection method may further include determining a forwarding determination mode of the relay device based on the first information, the forwarding determination mode indicating whether or not a person is in the facility, and the determining whether to execute processing may further include determining to transmit the communication message including the device control command to the second device based on the forwarding determination mode of the relay device determined in the determining of a forwarding determination mode.

Through this, in the determining whether to execute processing, using the forwarding determination mode determined in the determining of a forwarding determination mode makes it possible to reduce the amount of processing performed in the determining whether to execute processing. The determining whether to execute processing can therefore be executed quickly, which contributes to an improvement in the security measures.

Additionally, for example, the determining of a forwarding determination mode may include determining the forwarding determination mode to be an active mode when it can be determined, based on the first information, that a person is in the facility, and determining the forwarding determination mode to be an away mode when it is determined, based on the first information, that a person is not in the facility; and the determining whether to execute processing may include determining to transmit the device control command to the second device when the forwarding determination mode is the active mode, and determining not to transmit the device control command to the second device when the forwarding determination mode is the away mode.

Through this, in the determining whether to execute processing, whether to transmit the communication message to the second device can be determined based on whether the forwarding determination mode is active mode or away mode. In other words, the determination can be made more easily.

Additionally, for example, the forwarding determination mode may further include a non-active mode, and the determining of a forwarding determination mode may include determining the forwarding determination mode to be the active mode when it is determined, based on the first information, that a person is in the facility and the person is active, and determining the forwarding determination mode to be the non-active mode when it is determined, based on the first information, that a person is in the facility and the person is not active.

Through this, there are three forwarding determination modes, and thus the determination in the determining whether to execute processing can be made at a more detailed level than when there are two forwarding determination modes. Accordingly, the determination as to whether to transmit to the second device can be made more appropriately according to the state within the facility at the point in time when the communication message is received.

Additionally, for example, the second device may be an electric lock; the device control command may include either an unlock command for unlocking the electric lock or another command aside from the unlock command; and the determining whether to execute processing may include determining to transmit each of the unlock command and the other command to the second device when the forwarding determination mode is the active mode, determining to transmit only the other command among the unlock command and the other command to the second device when the forwarding determination mode is the non-active mode, and determining to transmit neither the unlock command nor the other command to the second device when the forwarding determination mode is the away mode.

Through this, whether or not an important command such as an unlock command can be sent can be determined appropriately, while suppressing unnecessary determinations not to transmit other commands.

Additionally, for example, the determining of a forwarding determination mode may further include determining the forwarding determination mode to be an entrance mode when it can be determined, based on the first information, that a person is present only near the entrance of the facility, and the determining whether to execute processing may include determining not to transmit the unlock command when the forwarding determination mode is the entrance mode and the first device is a device that is not present near the entrance.

Through this, when everybody is out but one of the residents has come home, an unlock command is allowed only from a terminal carried by the person who has come home (e.g., a smartphone or the like), which makes it possible to eliminate the inconvenience of a situation where the relay device remains in "away mode" and the entrance door cannot be opened because unlock commands are not allowed. Additionally, the relay device can prevent attacks such as a device (e.g., an air conditioner or lighting) installed in a room which is difficult to check from the entrance being turned on unauthorizedly even when the residents are away.

Additionally, for example, the determining of a forwarding determination mode may further include determining the forwarding determination mode to be a housesitting mode when, based on the first information, one or more people are in the facility and each person in the facility is a person not allowed to control the at least two devices over the in-facility network, and the determining whether to execute processing may include determining to transmit only the other command among the unlock command and the other command when the forwarding determination mode is the housesitting mode.

Through this, an unauthorized unlock command can be prevented from being transmitted to the electric lock. For example, intrusions by suspicious people can be reduced when only children are in the home.

Additionally, for example, the unauthorized communication detection method may be executed by the second device; the processing pertaining to the device control command may be processing of executing the device control command included in the communication message; the determining whether to execute processing may include, as the determining of whether to execute the processing pertaining to the device control command, determining whether the second device is to execute the device control command; and the executing may include, as the executing of the processing, controlling an operation of the second device based on the device control command.

Through this, unauthorized communication in the second device itself can be detected. This makes it possible to further improve security measures in the in-facility network.

Additionally, for example, the second device may be an electric lock, and the device control command may be an unlock command for unlocking the electric lock.

Through this, situations where suspicious people enter the facility can be suppressed effectively. In other words, the security measures in the facility can be carried out effectively.

Additionally, for example, the unauthorized communication detection method may further include, between the determining whether to execute processing and the executing, updating, when it is determined that the processing pertaining to the device control command is to be executed, the first information based on a state of at least one of a person in the facility and the at least two devices after the processing is executed.

Through this, the first information can be updated before the next instance of determining whether to execute processing, which makes it possible to reduce the amount of processing in the next instance of determining whether to execute processing. The determining whether to execute processing can therefore be performed more quickly.

Additionally, for example, the determining whether to execute processing may include further determining whether to execute the processing pertaining to the device control command based on a predetermined condition when the communication message is a message including the device control command, and the predetermined condition may be that the first device is a device having a predetermined function.

This makes it possible to suppress situations where, in the in-facility network, the message containing the device control command is transmitted to the second device from a device not having the predetermined function. For example, when the device not having the predetermined function is a device which is susceptible to cyberattacks from the outside before a device having the predetermined function, situations in which a message is transmitted from the first device, which does not have the predetermined function, to the second device, can be suppressed. Additionally, even if, for example, a device that does not have the predetermined function is attacked in some way and impersonates a device having the predetermined function partway through, the impersonating device can be determined to be a device not having the predetermined function based on the device list. Accordingly, and unauthorized communication detection method having further improved security measures can be provided.

Additionally, for example, the facility may be a residence.

This makes it possible to improve security measures in the in-home network.

Additionally, an unauthorized communication detection device according to one aspect of the present disclosure is an unauthorized communication detection device that detects an unauthorized communication message on an in-facility network over which at least two devices including a first device and a second device are communicably connected to each other. The unauthorized communication detection device includes: a receiver that receives, from the first device, a communication message transmitted from the first device to the second device; an obtainer that, when the communication message is received from the first device, obtains first information indicating a state of at least one of (a) a person in a facility in which the in-facility network is provided and (b) the at least two devices; a determiner that, based on the first information, determines whether to execute processing pertaining to a device control command that controls the second device when the communication message received from the first device is a communication message including the device control command; and an executer that executes the processing pertaining to the device control command when the processing is determined to be executed by the determiner.

This makes it possible to achieve the same effects as those of the above-described unauthorized communication detection method.

A recording medium according to one aspect of the present disclosure is a non-transitory computer-readable recording medium recorded thereon a program that causes a computer to execute the above-described unauthorized communication detection method.

This makes it possible to achieve the same effects as those of the above-described unauthorized communication detection method.

An unauthorized communication detection system and the like according to embodiments of the present disclosure will be described hereinafter with reference to the drawings. Note that the following embodiments describe preferred specific examples of the present disclosure. The numerical values, shapes, materials, constituent elements, arrangements and connection states of constituent elements, steps, orders of steps, and the like in the following embodiments are merely examples of the present disclosure, and are not intended to limit the present disclosure. The present disclosure is specified based on the content of the scope of claims. Accordingly, of the constituent elements in the following embodiments, constituent elements not denoted in the independent claims, which indicate the broadest interpretation of the present disclosure, are not absolutely necessary for solving the problem of the present disclosure, and will instead be described as constituent elements constituting more preferred forms.

Additionally, the drawings are not necessarily exact illustrations. Configurations that are substantially the same are given the same reference signs in the drawings, and redundant descriptions may be omitted or simplified.

Additionally, in the present specification, terms indicating relationships between elements, such as "the same", numerical values, and numerical value ranges do not express the items in question in the strictest sense, and also include substantially equivalent ranges, e.g., differences of several percent, as well.

Embodiment 1

An unauthorized communication detection system according to Embodiment 1 of the present disclosure determines whether a device control command is unauthorized based on a state of a resident living in a home, the state being estimated from, for example, information obtained from at least one of an operating state of each of appliances, each of sensors, or each of appliances. The configuration of the unauthorized communication detection system according to Embodiment 1 of the present disclosure will be described hereinafter.

1. Details of Embodiment 1

An unauthorized communication detection system according to the present disclosure will be described, with reference to the drawings, as an embodiment of the present disclosure. The present embodiment describes a case in which an appliance (a household appliance) and a PC (personal computer) are connected to a network in a household (in a home) (home network 11). In other words, in the present embodiment, the unauthorized communication detection system is a system that detects unauthorized communication in a home. Note, however, that the unauthorized communication detection system is not limited to being applied in a residence, and may be applied in a factory, a building, a hospital, a vehicle, or the like. The residence is an example of a facility in which the unauthorized communication detection system is applied.

1.1 Overall Configuration of Unauthorized Communication Detection System

FIG. 1 is a diagram illustrating the overall configuration of the unauthorized communication detection system according to the present embodiment.

As illustrated in FIG. 1, the unauthorized communication detection system includes Internet 10, home network 11, home gateway 20, PC 30, electric lock 40, air conditioner 41, lighting 42, controller 43, and terminal 50. Internet 10 is the Internet in general, and PC 30 is a typical personal computer. Home gateway 20, PC 30, electric lock 40, air conditioner 41, lighting 42, and controller 43 are connected to home network 11, and when PC 30, electric lock 40, air conditioner 41, lighting 42, and controller 43 communicate with a home server or terminal 50, that communication is performed via home gateway 20. Home network 11 is a communication network that communicably connects at least two devices (e.g., electric lock 40, air conditioner 41, lighting 42, and controller 43) to each other. Home network 11 is an example of an in-facility network.

Home gateway 20 is connected to PC 30, as well as to electric lock 40, air conditioner 41, lighting 42, and controller 43, and has a function for mediating communication among the connected devices, or communication between the connected devices and Internet 10. Additionally, home gateway 20 manages information such as IP (Internet Protocol) addresses needed by PC 30, as well as by electric lock 40, air conditioner 41, lighting 42, and controller 43, to communicate, assigns IP addresses in response to requests from each device, provides notifications of the information necessary for communication, and the like. Additionally, home gateway 20 monitors whether or not unauthorized device control commands are being transmitted to electric lock 40, air conditioner 41, and lighting 42, and blocks the unauthorized device control commands as necessary. Home gateway 20 is a relay device that relays communication messages exchanged between at least two devices, and is an example of a relay device that executes the unauthorized communication detection method described later, as well as of an unauthorized communication detection device.

Electric lock 40, air conditioner 41, and lighting 42 are devices (appliances) that operate by receiving device control commands and interpreting the content of the received device control commands. Additionally, electric lock 40, air conditioner 41, and lighting 42 notify other devices of operating states of each of the devices or information detected by sensors provided in each of the devices (sensor information). For example, when a lock operation is performed, electric lock 40 transmits, to another device, a message of a notification that a locked state is in effect after the operation is complete. When an unlock operation is performed, too, electric lock 40 transmits a message of a notification that an unlocked state is in effect to another device, in the same manner as with the lock operation. Additionally, for example, air conditioner 41 notifies another device of an operating state such as an operating (on) state or a non-operating (off) state, an operation mode of air conditioner 41 (automatic/cooling/heating/dehumidifying/humidifying/fan/etc.), a set temperature set in air conditioner 41, information of a sensor installed in air conditioner 41 (room temperature/humidity/outside temperature), setting values of air conditioner 41 such as air direction and air volume, and the like. Additionally, for example, lighting 42 notifies another device of an operating state such as on or off, a setting value of a dimming function when such a dimming function is provided, and so on. These notifications may be made periodically, when a state or value changes, or when an inquiry arrives from another device.

Electric lock 40, air conditioner 41, and lighting 42 are examples of devices connected to home network 11. Electric lock 40 is also an example of a second device. Note that it is sufficient for the unauthorized communication detection system to include at least two devices.

Controller 43 is a device for controlling electric lock 40, air conditioner 41, and lighting 42, and controls electric lock 40, air conditioner 41, and lighting 42 by transmitting device control commands to those devices. Controller 43 may transmit the device control command in response to an input made by a user, or may automatically transmit the device control command in accordance with a condition set in advance. Controller 43 may be a dedicated apparatus on home network 11, or may be a mobile terminal such as a smartphone.

Terminal 50 is a device connected to Internet 10 over a mobile phone network (wireless), and views the states of electric lock 40, air conditioner 41, and lighting 42 from outside the home, or receives notifications from home gateway 20. Note that home gateway 20 and terminal 50 may exchange information by having a server (not shown) connected to Internet 10 and having home gateway 20 and terminal 50 communicate with the server via Internet 10. Terminal 50 may be a mobile terminal such as a smartphone.

Although the present embodiment describes three devices, i.e., electric lock 40, air conditioner 41, and lighting 42, as devices that receive device control commands and constituent elements of the device control command monitoring system, it is not absolutely necessary for the devices to be these three devices. Other devices may be used, and the number of devices is not limited to three. Furthermore, in addition to receiving device control commands, these devices may transmit device control commands to other devices, and may perform communication aside from device control commands. Additionally, these devices may communicate with terminal 50, a server (not shown), or the like on Internet 10 via Internet 10.

Although terminal 50 is described as being connected to Internet 10, the configuration is not limited thereto. Terminal 50 may be connected to home gateway 20 directly and view the states of electric lock 40, air conditioner 41, and lighting 42, control devices, or receive notifications from home gateway 20.

The following will described air conditioner 41 as a first device and electric lock 40 as a second device, the configuration is not limited thereto. The first device may be any device capable of transmitting a device control command to the second device over home gateway 20, and can also be called a device that is a transmission origin of a device control command. The first device may be a mobile terminal that can be carried by hand, e.g., terminal 50. The second device may be any device provided in a home. The second device can also be called a device that is a transmission destination of a device control command.

1.2 Configuration of Home Gateway 20

Figure 2:
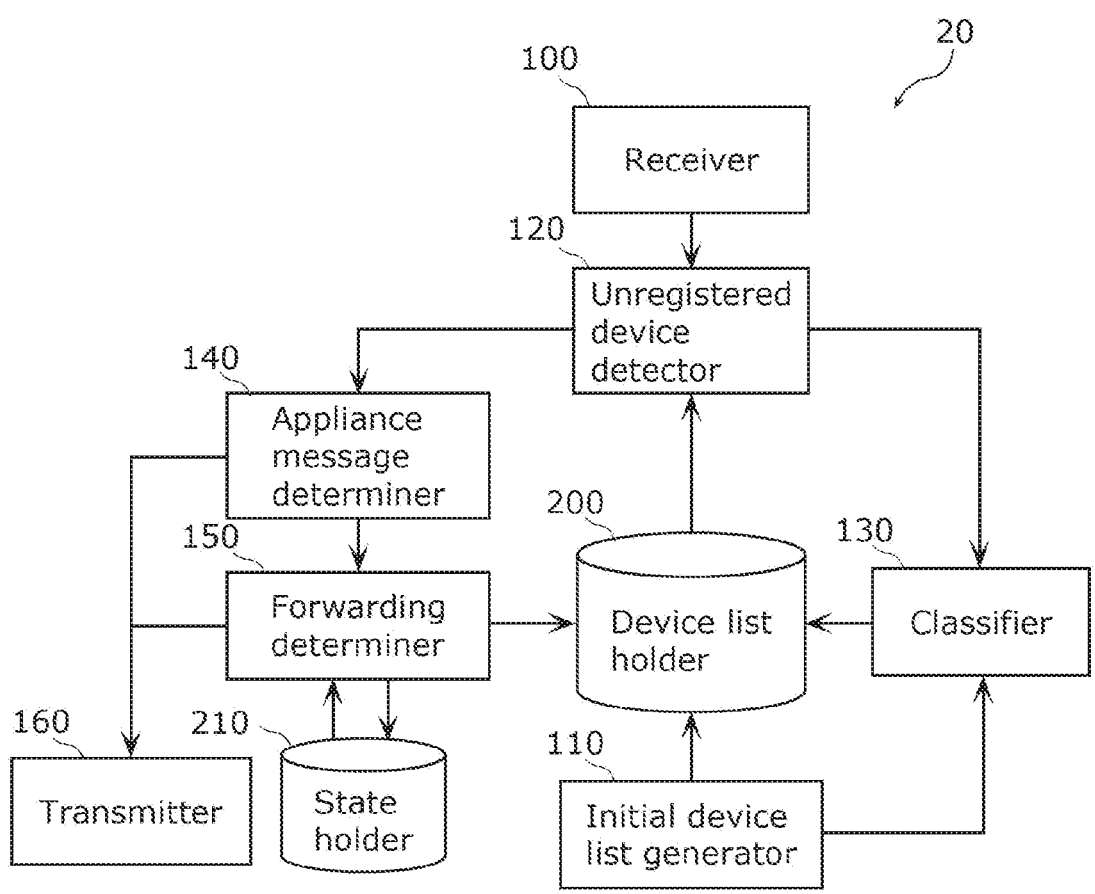
FIG. 2 is a block diagram of a home gateway according to Embodiment 1.

FIG. 2 is a block diagram of home gateway 20 according to the present embodiment.

As illustrated in FIG. 2, home gateway 20 includes receiver 100, initial device list generator 110, unregistered device detector 120, classifier 130, appliance message determiner 140, forwarding determiner 150, transmitter 160, device list holder 200, and state holder 210.

Note that these configurations are configurations indicating functions, and are realized by programs held in storage of home gateway 20 being read out and executed by a processor, predetermined data being held in the storage, or data being transmitted and received via an inputter/outputter, or realized by a combination of these.

Receiver 100 receives a communication message from Internet 10 or home network 11. Receiver 100 receives not only communication messages addressed to home gateway 20, but also all communication messages flowing in a communication line to which home gateway 20 is connected.

Initial device list generator 110 is connected to home network 11. Initial device list generator 110 performs processing for generating a device list when no device list is present in device list holder 200 or the device list has been deleted, such as at the time of the first startup, when an instruction has been made by the user to reset the device list held in device list holder 200, or the like. Initial device list generator 110 searches for devices connected to home network 11 and registers devices which have been found in the device list. Additionally, initial device list generator 110 requests classifier 130 to classify devices registered by initial device list generator 110. Although details will be given later, the device list includes information pertaining to at least two devices connected to home network 11. In the present embodiment, the device list includes information pertaining to PC 30, electric lock 40, air conditioner 41, lighting 42, and controller 43. The device list may further includes information pertaining to terminal 50 connected to home gateway 20.

Unregistered device detector 120 compares information pertaining to at least one of a transmission origin and a transmission destination of the communication message received by receiver 100 with the information registered in device list holder 200, and checks whether or not at least one of the transmission origin and the transmission destination of the communication message is a device registered in device list holder 200. If a device corresponding to at least one of the transmission origin and the transmission destination of the communication message is not registered in device list holder 200, unregistered device detector 120 requests classifier 130 to register a class of that device in device list holder 200.

Classifier 130 classifies each of the at least two devices connected to home network 11 according to whether or not the device is a device having a predetermined function. The predetermined function is, for example, that the device supports a predetermined communication protocol in home network 11. In the present embodiment, classifier 130 classifies each of the at least two devices connected to home network 11 as "appliance" (including residential equipment) or "non-appliance". Classifier 130 classifies, for example, a device capable of communication using a protocol for controlling appliances (an example of the predetermined communication protocol) as an appliance, and classifies a device not capable of communicating using the protocol for controlling appliances as a non-appliance. For example, in ECHONET Lite (registered trademark; the same applies hereinafter), classifier 130 registers a device that correctly responds to an inquiry message transmitted by home gateway 20 as an appliance, and registers a device that does not respond or responds incorrectly as a non-appliance.

Note that the at least two devices may include, for example, at least one appliance. Additionally, the predetermined communication protocol is a communication protocol for short-range wireless communication through communication between home gateway 20 and terminal 50, and is, for example, ECHONET Lite or ZigBEE (registered trademark; the same applies hereinafter), but is not limited thereto.

Appliance message determiner 140 determines whether or not a received message received by receiver 100 is a message pertaining to the protocol for controlling appliances (an appliance message), and when the received communication message is determined to be an appliance message, requests forwarding determiner 150 to determine whether or not to transmit (forward) the message to the transmission destination. In, for example, the case of ECHONET Lite, the specifications state that communication is performed using the port having a UDP (User Datagram Protocol) port number 3610, and thus when determining whether or not the received message is an appliance message, appliance message determiner 140 may determine that the message is an appliance message when a transmission destination port number of the message is 3610. Furthermore, in ECHONET Lite, the specifications state that 0x1081 or 0x1082 is set for the first two bytes of the communication data, and thus appliance message determiner 140 may determine that the received message is an appliance message when the first two bytes of a data part of the received message are 0x1081 or 0x1082. Additionally, appliance message determiner 140 may perform the determination using a combination of the foregoing, or using different information.

In this manner, appliance message determiner 140 determines whether or not a communication message corresponds to a protocol assumed to be used by home gateway 20, based on the content of the communication message. When home gateway 20 supports a plurality of protocols, appliance message determiner 140 determines to which protocol the communication message corresponds. In this case, if it is determined that the communication message does not correspond to any protocol, appliance message determiner 140 determines that the message is unrelated to protocols for controlling appliances.

When appliance message determiner 140 determines that a received communication message (a received message) is an appliance message, forwarding determiner 150 determines whether or not to further transmit (forward) that received message to a transmission destination denoted in the received message. Forwarding determiner 150 is an example of a determiner. Additionally, the processing of transmitting (forwarding) the received message (a communication message including a device control command) is an example of processing pertaining to a device control command.

Forwarding determiner 150 obtains information pertaining to the transmission origin device from the received message, and obtains a device No. from a device list held by device list holder 200. If the received message contains information pertaining to a state of the device that transmitted the message, forwarding determiner 150 obtains the information pertaining to the state and registers the state in a state list held by state holder 210 (described later). Additionally, if the received message contains sensor information, forwarding determiner 150 registers the sensor information in the state list. Furthermore, if the received message contains information pertaining to the state of the device that transmitted the message, or contains sensor information, forwarding determiner 150 estimates a state of a resident living in the home from that information, or from that information and information registered in the state list, and registers the estimated state in the state list. After the state is registered, transmitter 160 is requested to forward the received message.

Additionally, if home gateway 20 itself includes some kind of sensor, sensor information from that sensor may be registered in the state list, and the state of a resident living in the home may be estimated from that sensor information, or from that sensor information and information registered in the state list, and registered in the state list.

If the received message contains a device control command, forwarding determiner 150 obtains, from state holder 210, the state list holding the states of each device at that point in time, and a determination list (rules) pertaining to each control command of the devices controlled by the device control command, and determines whether it is okay to forward that device control command.

FIG. 3 is a diagram illustrating an example of the state list according to the present embodiment. FIG. 4 is a diagram illustrating an example of the determination list according to the present embodiment. FIG. 4 is an example of a determination list pertaining to an unlock command for electric lock 40. Note that the state list illustrated in FIG. 3 is an example of first information. The first information indicates the states of a person in the home in which home network 11 is provided, and of at least one of the at least two devices. Note that each of the at least two devices may be provided in a fixed state in the home in which home network 11 is provided, or may be provided in a portable state.

As illustrated in FIG. 4, the determination list holds, in list format, information as to whether or not it is okay to forward an unlock command for electric lock 40 (OK/NG) ("determine whether to unlock electric lock" in FIG. 4), and information pertaining to at least one state of each device and resident (an example of a person in the facility in which the in-facility network is provided). Forwarding determiner 150 determines whether a current state (the state indicated in FIG. 3) matches any of the states indicated in the determination list, and uses information as to whether it is okay to forward an unlock command, corresponding to a matched state (OK/NG), as a determination result for the current state.

For example, if the state of each device, the resident, or the like is a state in the state list illustrated in FIG. 3, forwarding determiner 150 recognizes that in the determination list in FIG. 4, the state of at least one of each device and the resident is the state in the final row, determines that it is not okay to forward the unlock command for electric lock 40 (NG), and does not forward the received message. Furthermore, according to the determination list in FIG. 4, even if the state is one aside from a state in the state list illustrated in FIG. 3, when all residents are away and both air conditioner 41 and lighting 42 are off, forwarding determiner 150 determines that it is not okay to forward the unlock command for electric lock 40 (NG), and furthermore, if both air conditioner 41 and lighting 42 are on and all residents are on the second floor, forwarding determiner 150 determines that it is not okay to forward the unlock command for electric lock 40. Additionally, if air conditioner 41 is on and lighting 42 is off, and a resident is on the first floor, forwarding determiner 150 determines that it is okay to forward the unlock command for electric lock 40 (OK). In addition to this, regardless of the state of air conditioner 41, lighting 42, and the like, if all residents are away, forwarding determiner 150 may determine that it is not okay to forward the unlock command for electric lock 40 (NG), and if both air conditioner 41 and lighting 42 are on and at least one resident is on the first floor, forwarding determiner 150 may determine that it is okay to forward the unlock command for electric lock 40. Furthermore, if a Wi-Fi access point (Wi-Fi AP) is installed on home network 11, and the Wi-Fi AP is communicating with a smartphone carried by a resident, forwarding of the unlock command for electric lock 40 transmitted from that smartphone may be determined to be "OK".

Note that it is sufficient for the state list illustrated in FIG. 3 to include the state of at least one person in the home and at least one of the at least two devices. In the present embodiment, the state list includes the states of both the person in the home and the at least two devices. The state list may also include the state of at least one of the at least two devices.

When the message received by receiver 100 as not an appliance message, or when forwarding determiner 150 has determined to forward the message, transmitter 160 transmits (forwards) the message to the transmission destination. In the present embodiment, transmitter 160 transmits a communication message from the first device to the second device as the execution of the processing pertaining to the device control command. Transmitter 160 is an example of an executer.

Figures 5, 6:
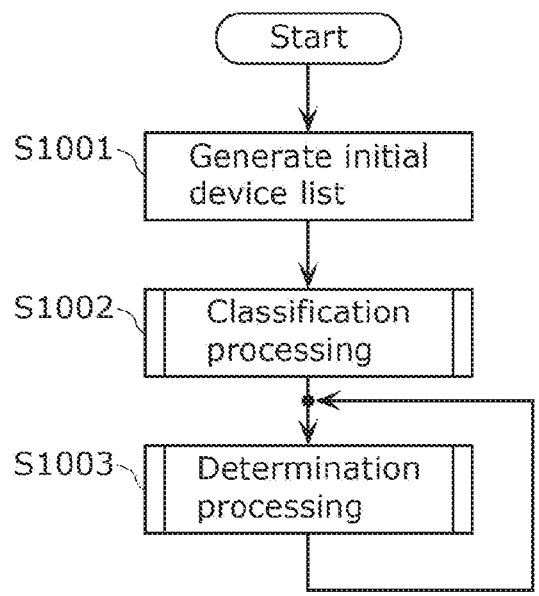
FIG. 5 is a diagram illustrating an example of a device list according to Embodiment 1.
FIG. 6 is a flowchart illustrating an example of main processing of the home gateway according to Embodiment 1.

Device list holder 200 holds information pertaining to the at least two devices connected to home network 11 in list format as the device list. FIG. 5 is a diagram illustrating an example of the device list according to the present embodiment.

A Media Access Control (MAC) address, which is an example of an identifier, and a device type as classified by classifier 130 are registered in association with each other in the device list, as illustrated in FIG. 5.

State holder 210 holds information pertaining to the states of appliances connected to home network 11 as the state list (see FIG. 3). The device No. of an appliance among the devices registered in the device list held by device list holder 200, and the state of a resident living in the home, are registered in the state list illustrated in FIG. 3. In addition, state holder 210 holds the determination list (see FIG. 4) that serves as a reference for forwarding determiner 150 to determine whether to forward. The determination list illustrated in FIG. 4 holds information ("OK" or "NG", in the case of FIG. 4) of the device control command (determining to unlock electric lock 40, in the case of FIG. 4) subject to the determination, as well as the device No. of the appliance among the devices registered in the device list held by device list holder 200, the state of that device, and the state of the residents living in the house as conditions for determining the information of the device control command. At this time, there may be cases where the state of at least one of the devices and the resident may be any state, in which case the condition may be expressed using a symbol such as "-" or the like.

Device list holder 200 and state holder 210 are realized by, for example, a Hard Disk Drive (HDD), semiconductor memory, or the like, but are not limited thereto.

Although the foregoing describes classifier 130 as classifying the at least two devices connected to home network 11 as appliances or non-appliances, the configuration is not limited thereto, and the devices may be classified as devices that can or cannot be controlled by home gateway 20. Devices that cannot be controlled by home gateway 20 include, for example, a device for which a control method is not provided in home gateway 20. Devices that can be controlled by home gateway 20 are devices having functions which can be controlled by a control method provided in home gateway 20, and are an example of devices having a predetermined function. Such a device can also be called a device to be controlled by home gateway 20. Additionally, devices that cannot be controlled by home gateway 20 are devices lacking functions which can be controlled by a control method provided in home gateway 20, and are an example of devices not having a predetermined function.

Classifier 130 can also classify the devices in at least three ways, instead of two. For example, when a plurality of devices supporting different protocols for controlling devices are connected to home network 11 and devices supporting the same protocol communicate with each other, classifier 130 may classify the devices according to the types of the protocols. Additionally, classifier 130 may, for example, classify the devices into controlled appliances, controlling appliances, and non-appliances; at least three of controlled appliances, controlling appliances, controlling/controlled appliances, appliances that only provide notifications of information such as sensor information, and non-appliances; only some of these classifications; or a combination of these classifications.

The device list illustrated in FIG. 5 may be registered with information other than a MAC address and a device type, or information other than a MAC address may be used as an identifier. For example, an IP address may be registered, and if home gateway 20 includes a plurality of communication ports for connecting to communication lines, the communication port to which the device is connected may be registered. Additionally, whether the device only transmits, only receives, or both transmits and receives control messages for controlling appliances may be registered, and a detailed type such as whether the appliance is an electric lock, an air conditioner, lighting, a controller, or the like may be registered.

Although FIG. 3 only indicates "on" and "off" as device states, the device states are not limited thereto. For example, for electric lock 40, a state of being unlocked/locked may be registered; for air conditioner 41, a set temperature, an operating mode (cooling/heating or the like), and so on may be registered aside from "on" and "off"; for lighting 42, a state of dimming may be registered aside from "on" and "off"; for a motion sensor (not shown), a person being detected/a person not being detected may be registered; for a humidity sensor (not shown), a temperature or humidity value itself may be registered; and for a window or door open/closed sensor, information such as opened/closed, a numerical value indicating how wide the window or door is opened, the state of a lock (locked/unlocked), or the like may be registered.

Additionally, as the state of the resident, in addition to being present or away, information about where the resident is in the home, such as being only on the first floor, only on the second floor, only in a bedroom, only in the living room, only in the dining room and kitchen, and so on may be registered; attributes of people who are at home, such as only children or only grandparents being present, may be registered; what the resident is doing, such as sleeping; whether the resident is active; and the like may be registered. Although one state is registered for each device and resident in FIG. 3, a plurality of states may be registered, separate columns may be registered for each state, parents and children may be registered in separate columns, each resident may be registered in a separate column, and a column for visitors may be provided.

The state of the residents is registered by analyzing the usage state of each device or information from various sensors. The state of the residents may be determined, for example, from information from motion sensors installed in the home, or from information analyzed from images or video from cameras installed in the home. The state of the residents can also be determined by having all residents carry a transmitter, such as an RF tag, and using a receiver, such as an RF receiver installed in the home, to determine where the transmitter is in the home, whether the transmitter is moving, and whether the transmitter is moving by receiving information from a sensor mounted on the transmitter. The state of the residents may be determined by having all residents carry a receiver, installing a transmitter in the home, and notifying a server or a controller in the home, such as home gateway 20, of signals received by the receiver, from information ascertaining the movement of the residents using an indoor positioning system, or from other information.

The state of the residents may also be determined from information which makes it possible to determine whether people are actually in the house or information which makes it possible to determine that people are moving, i.e., from sensor information obtained from each appliance and the like (e.g., information from a refrigerator open/closed sensor, information from window and door open/closed sensor, water usage amounts in the kitchen and bathrooms, room temperature, humidity, chemical concentrations such as carbon dioxide concentration or changes in these concentrations).

Note that the determination list illustrated in FIG. 4 is an example, and other devices may be included; furthermore, the devices may be grouped by the type of device, the room in which the device is installed, or the like, rather than defining the status of each individual device. The states of the devices and residents are not limited to "on" and "off", and can include various states, information, and the like, in the same manner as the state list. For example, as the state, the operating mode of the device, the state of dimming, the temperature or humidity value itself, and the like may be registered, a plurality of states may be registered, or the states may be registered in different columns. Furthermore, if a determination can be made regardless of the specific state of a given device, not taking the state of that device into account may be registered in the determination list. The information included in the state list may include information such as the device No., the identifier, the device type, and the like as information on transmission origins that are allowed and transmission origins that are not allowed. Alternatively, information pertaining to a site on Internet 10 accessed immediately previous, what communication protocol was used, the information exchanged with the protocol used, and the like may be included in the information included in the state list, as information pertaining to a communication message aside from the appliance message. Although only one determination list is illustrated in FIG. 4, there may be individual determination lists corresponding to each device control command of each device, such as a determination list for determining the locking of the electric lock, a determination list for determining whether the air conditioner is on or off, a determination list for determining changes to the operating mode of the air conditioner or a change to the set temperature, a determination list for determining whether the lighting is on or off, a dimmer setting, and the like. Furthermore, the determination list may be divided into a determination list for determining that a device control command is "OK", and a determination list for determining "NG".

If the received message contains information pertaining to the state of the device that transmitted the message, forwarding determiner 150 registers that state in the state list of state holder 210, and then forwards the received message, but the configuration is not limited thereto. As with the device control command, the information pertaining to the state may be registered, and the received message forwarded, only if the information pertaining to the state of the device included in the received message is determined to be a correct state. Alternatively, forwarding determiner 150 may register the information pertaining to the state, and transfer the received message regardless of the determination result, only if the state is determined to be a correct state. Furthermore, if the state is determined not to be a correct state, forwarding determiner 150 may notify the user and leave the determination as to whether to forward to the user. For example, forwarding determiner 150 may register a range of normal values or a pre-determined amount of change for temperature and humidity values in the determination list, and determine that the state is not correct when the values fall outside the range of the registered values or when the values change rapidly compared to the registered values. Furthermore, for each window and door state (open/closed, how open), an amount of change for determining that the state is correct may be registered in the determination list, and the state may be determined not to be correct when the values change rapidly compared to the registered values.

Although forwarding determiner 150 determines whether it is okay to forward the device control command from the determination list, the configuration is not limited thereto. For example, forwarding determiner 150 may determine whether or not it is okay for the device to be controlled to execute the device control command.

By registering the state of each device and resident in the state list and the determination list in a more detailed manner, more detailed determinations can be made, which makes it possible to improve the detection performance in home gateway 20. Additionally, grouping devices by type or installation location makes it possible to simplify the determination list, skip reconfigurations caused by devices being replaced, and the like.

1.3 Operations of Device Control Command Monitoring System

Operations of a device control command monitoring system include (1) main processing, (2) classification processing, and (3) determination processing.

Each of these will be described hereinafter with reference to the drawings. Note that it is acceptable for the operations of the device control command monitoring system to include at least (3), the determination processing.

1.3.1 Operations in Main Processing

FIG. 6 is a flowchart illustrating an example of the main processing of home gateway 20 according to the present embodiment.

As illustrated in FIG. 6, first, if there are no devices registered in device list holder 200 at the time of startup, home gateway 20 generates the device list (an initial device list) using initial device list generator 110 (S1001). Initial device list generator 110 transmits, for example, an ARP (Address Resolution Protocol) message to all IP addresses in the same subnet in order to extract devices connected to home network 11, and registers devices that respond in device list holder 200.

Next, initial device list generator 110 requests classifier 130 to classify the devices registered in device list holder 200, and classifier 130 executes the classification processing (S1002).

Steps S1001 and S1002 are processing for initial settings.

After the classification processing is complete, home gateway receives a communication message and executes the determination processing (S1003). Home gateway 20 repeats the determination processing each time a single communication message is received.

Although the foregoing describes transmitting ARP messages and registering devices that respond in device list holder 200 when generating the device list, the configuration is not limited thereto, and for example, ICMP (Internet Control Message Protocol) Echo Messages may be transmitted, and the device list may be generated from response messages responding thereto; or another method may be used.

1.3.2 Operations in Classification Processing

Figure 7:
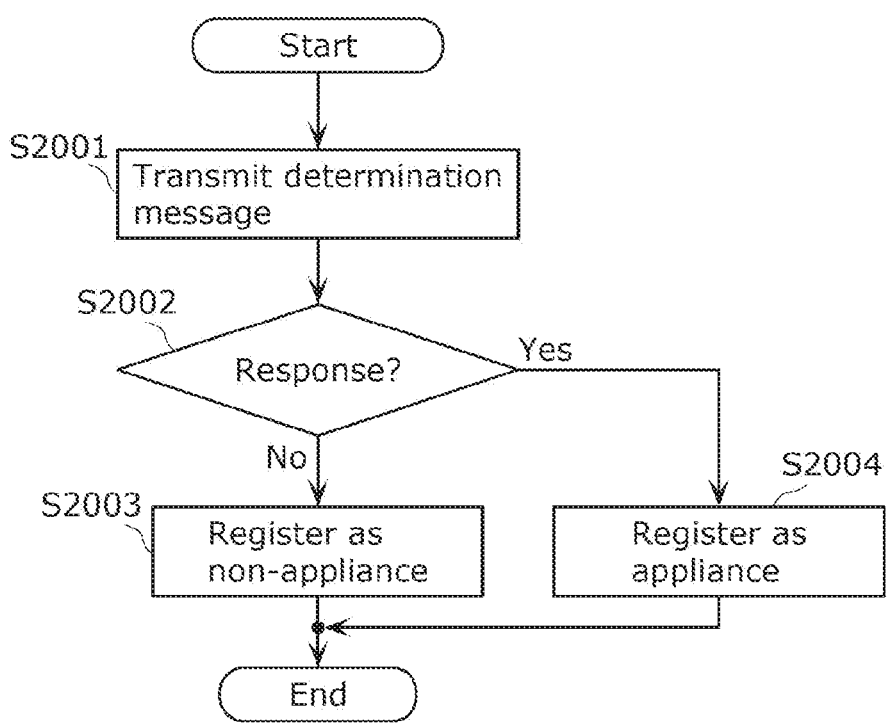
FIG. 7 is a flowchart illustrating an example of classification processing of a classifier according to Embodiment 1.

FIG. 7 is a flowchart illustrating an example of the classification processing of classifier 130 according to the present embodiment.

As illustrated in FIG. 7, first, in response to a request from initial device list generator 110 or unregistered device detector 120, classifier 130 transmits, to each of the plurality of devices, a message (a determination message) for determining whether or not communication is possible with the plurality of devices connected to home network 11 using a protocol for controlling appliances (S2001). Here, classifier 130 may transmit the determination message as a broadcast or multicast which can be received by unspecified devices connected to home network 11, or may transmit the determination message individually to devices registered in device list holder 200.

Next, classifier 130 determines whether or not a device that received the determination message has returned a response message (S2002). If the determination message has been transmitted through broadcast, multicast, or the like, classifier 130 waits for the response message until a set amount of time has passed following the transmission of the determination message, determines "response" for a device which has transmitted a response message, and determines "no response" for a device which has not transmitted a response message before the set amount of time has passed. On the other hand, if the determination message has been transmitted to devices individually, classifier 130 determines "response" if a response message is received, and determines "no response" if a response message is not received before a set amount of time has passed.

Classifier 130 determines that a device determined to have "no response" in step S2002 (No in S2002) is not an appliance, and registers "non-appliance" in device list holder 200 (S2003). Classifier 130 determines that a device determined to have "response" in step S2002 (Yes in S2002) is an appliance, and registers "appliance" in device list holder 200 (S2004). When registering "appliance" or "non-appliance" as the device type in the device list held by device list holder 200 in step S2003 or step S2004, if there is no information aside from the device type in the device list, classifier 130 registers that as well.

1.3.3 Operations in Determination Processing

Figure 8:
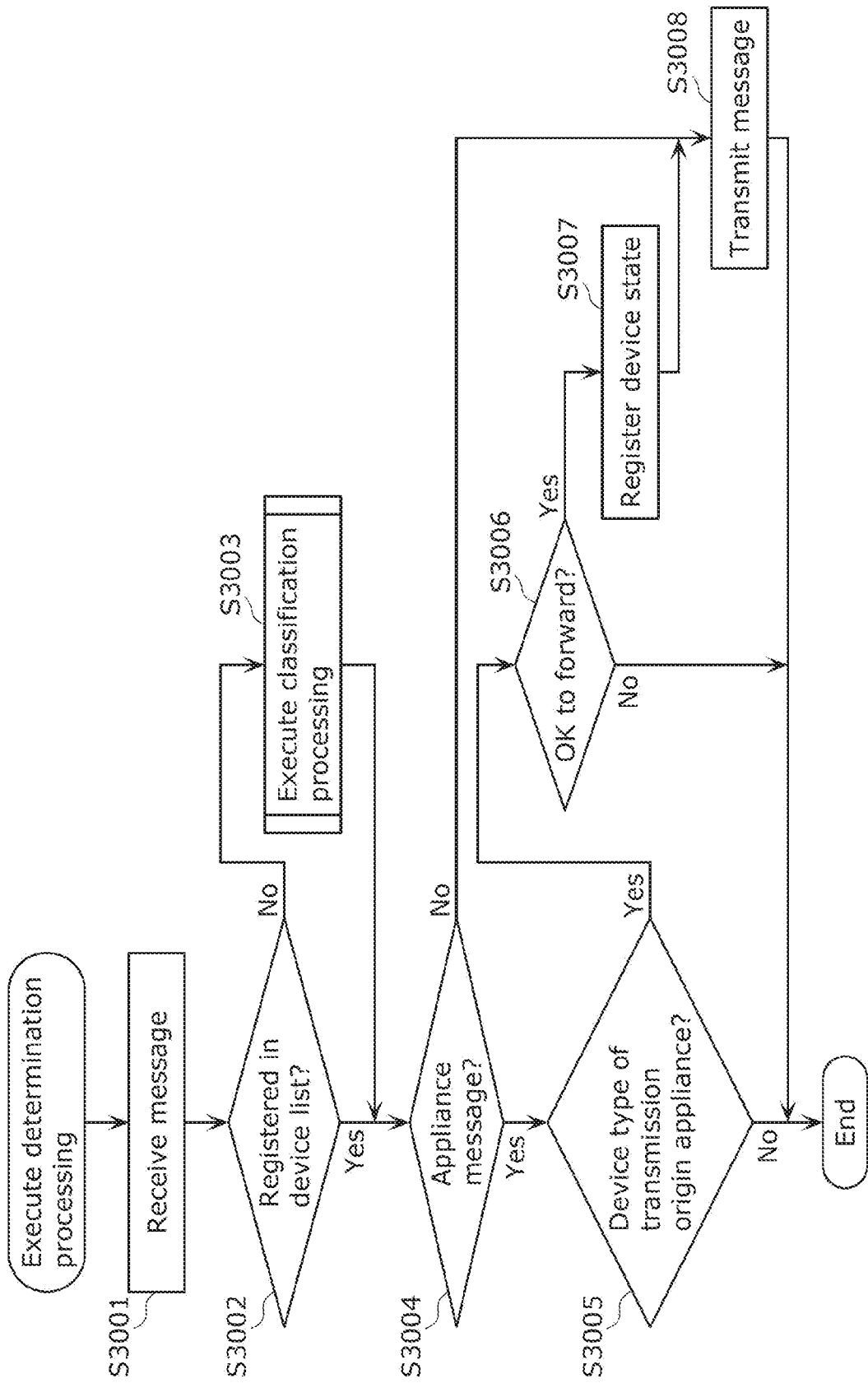
FIG. 8 is a flowchart illustrating an example of determination processing of the home gateway according to Embodiment 1.

FIG. 8 is a flowchart illustrating an example of the determination processing of home gateway 20 according to the present embodiment. The processing illustrated in FIG. 8 represents an unauthorized communication detection method that detects an unauthorized communication message on home network 11 over which at least two devices including the first device and the second device are communicably connected to each other. In the present embodiment, home gateway 20 executes the processing illustrated in FIG. 8, for example.

As illustrated in FIG. 8, first, receiver 100 receives a communication message (S3001). Receiver 100 receives, from a transmission origin device (an example of the first device), a communication message addressed to a transmission destination device (an example of the second device), the communication message being transmitted from the transmission origin device to the transmission destination device. For example, receiver 100 receives, from air conditioner 41, a communication message transmitted from air conditioner 41 to electric lock 40. Step S3001 is an example of a step of receiving. In this case, the second device is electric lock 40, and the device control command is an unlock command for unlocking electric lock 40.

Next, unregistered device detector 120 determines whether or not the device is registered in the device list of device list holder 200 based on information of the transmission origin device (MAC address, IP address, port number, and so on) in the received communication message (received message) (S3002).

If it is determined in step S3002 that the device is "not registered" (No in S3002), unregistered device detector 120 requests classifier 130 to perform the classification processing. Classifier 130 then executes the classification processing (S3003).

If it is determined in step S3002 that the device is "registered" (Yes in S3002), or after it is determined that the device is "not registered" and the classification processing (S3003) has been executed, appliance message determiner 140 determines whether or not the received message is an appliance message (S3004). Appliance message determiner 140 makes the determination of step S3004, for example, based on whether or not the transmission destination port number in the received message is 3610, or whether or not the first two bytes of the data part of the communication message are 0x1081 or 0x1082.

If it is determined in step S3004 that the received message is an "appliance message" (Yes in S3004), appliance message determiner 140 requests forwarding determiner 150 to perform an additional determination. The received message being an "appliance message" means that the transmission destination device is an appliance and the message includes a device control command for controlling that appliance. If it is determined in step S3004 that the received message is "not an appliance message" (No in S3004), appliance message determiner 140 requests transmitter 160 to transmit the message. A received message determined to be "not an appliance message" is a normal message, e.g., a message for communicating over a browser or the like, but is not limited thereto.

Forwarding determiner 150 obtains information on the device type of the transmission origin device of the received message from device list holder 200, and determines whether or not the device type of the transmission origin device is an appliance (S3005). If the communication message is a message containing a device control command (Yes in S3004), forwarding determiner 150 may further determine whether to execute processing pertaining to the device control command based on a predetermined condition. The predetermined condition includes the transmission origin device (e.g., air conditioner 41) being a device having the predetermined function.

Next, if the transmission origin device is determined to be an "appliance" in step S3005 (Yes in S3005) and the received message contains a device control command, forwarding determiner 150 obtains, from state holder 210, the state list holding the states of each device at that point in time, and a determination list pertaining to each control command of the devices controlled by the device control command, and determines whether it is okay to forward that device control command (S3006). Step S3006 includes a step of obtaining and a step of determining whether to execute processing, which will be described below. Note that the step of determining whether to execute processing may include determining whether to execute processing pertaining to the device control command based on the above-described predetermined condition.

Obtaining the state list is an example of the step of obtaining. In this step, if a communication message has been received from air conditioner 41, forwarding determiner 150 obtains the state list indicating the state of at least one of a person in the home and the at least two devices. The state list obtained in this step may include, for example, the state at the point in time when the communication message is received in step S3001.

Furthermore, determining whether it is okay to forward the control command is an example of the step of determining whether to execute processing. In the step of determining whether to execute processing, forwarding determiner 150 determines, based on the state list, whether to execute processing pertaining to a device control command that controls electric lock 40 when the communication message received from air conditioner 41 is a communication message including the device control command. In the present embodiment, forwarding determiner 150 determines whether to transmit the communication message including the device control command to electric lock 40 as the determination as to whether to execute the processing pertaining to the device control command.

Note that if the received message includes information expressing the state of the device in addition to the device control command, forwarding determiner 150 may determine whether it is okay to forward after applying the information pertaining to the state to the information registered in the state list. For example, although the state list is obtained in the step of obtaining by reading out the state list from state holder 210, the state of at least one of a person in the home and the at least two devices may be obtained from the information indicating the state of the device included in the received message. In this case, the information on the state of the device, included in the received message, is an example of the first information. Additionally, forwarding determiner 150 functions as an obtainer that obtains the first information.

If the transmission origin device is determined to be an "appliance" in step S3005 and the received message does not include a device control command, forwarding determiner 150 determines that it is okay to forward the received message in step S3006.

When a determination of "Yes" is made in step S3006, forwarding determiner 150 registers the device state if it is necessary to update the information of the state list held by state holder 210 with the information included in the received message (S3007). Forwarding determiner 150 can also be said to update the device state in the state list. At this time, forwarding determiner 150 may update the state of a person in the state list. In this manner, if, for example, it is determined to execute the processing pertaining to the device control command between steps S3006 and S3008, forwarding determiner 150 may update the state list based on the state of at least one of a person in the home and the at least two devices after executing the stated processing. Step S3007 is an example of a step of updating. Note that the state of at least one of a person in the home and the at least two devices after the processing is executed may be estimated based on the device control command. Additionally, step S3007 may be executed after step S3008.

Forwarding determiner 150 then requests transmitter 160 to transmit the message.

When a determination of "No" is made in step S3005 or S3006, forwarding determiner 150 ends the determination processing. A determination of "No" being made in step S3006 corresponds to detecting an unauthorized communication message.

The state list may include at least the state of a person. Then, in the step of determining whether to execute processing, if it can be determined from the state list that a person is in the home, forwarding determiner 150 may determine to transmit the communication message including the device control command to the second device, whereas if it can be determined from the state list that a person is not in the home, forwarding determiner 150 may determine not to transmit the communication message including the device control command to the second device.

If it is determined in step S3005 that the transmission origin device is a "non-appliance", forwarding determiner 150 ends the determination processing without transmitting the received message.

Next, transmitter 160 transmits the message in response to the message transmission request from appliance message determiner 140 or forwarding determiner 150 (S3008), and then ends the determination processing. For example, transmitter 160 transmits the received message to the transmission destination device when forwarding determiner 150 has made a determination of Yes in step S3006. Transmitter 160 transmitting the received message to the transmission destination device is an example of a step of executing. In the step of executing, when it is determined in step S3006 to execute the processing pertaining to the device control command, that processing is executed. In the present embodiment, forwarding determiner 150 determines whether to transmit the communication message including the device control command to electric lock 40 as the determination as to whether to execute the processing pertaining to the device control command.

Although the foregoing describes home gateway 20 as requesting appliance message determiner 140 to determine whether or not the received message indicates an appliance after the classification processing (S3003) is executed, the configuration is not limited thereto, and home gateway 20 may end the determination processing after the classification processing and wait to receive the next message, or may notify the transmission origin of the received message of an error.

Additionally, although the foregoing describes unregistered device detector 120 as determining whether or not a device is registered in the device list based on the information of the transmission origin device of the received message, the configuration is not limited thereto, and whether or not the device is registered in the device list may be determined based on information of the transmission destination device of the received message, or may be determined based on device information of both the transmission destination and the transmission origin.

Note that the processing of steps S3002 to S3004 illustrated in FIG. 8 are not necessary.

1.4 Effects of Embodiment 1

In the present embodiment, when home gateway 20 receives an appliance message, whether to allow the forwarding of a device control command included in the appliance message is determined not using information included in the appliance message, but rather using the state of at least one of a person in the home and the at least two devices. In other words, in the present embodiment, information in the appliance message (e.g., control content) is not used to determine whether to allow the forwarding of a device control command. For example, the state of each of devices and the state of residents are estimated from an appliance message received by home gateway 20, and the forwarding of a device control command is allowed only when the state is correct.

Through this, a device control command transmitted during a state in which device control is normally not performed, i.e., a state in which a device control command is normally not transmitted, can be detected as being an unauthorized device control command, based on the state of at least one of a person in the home and the at least two devices. Accordingly, this increases the possibility that an unauthorized device control command can be detected even if information pertaining to the device, included in the message, has been forged by an attacker. Note that at least one of the state of each of the devices and the state of the residents may be estimated based on sensing results from sensors.

Additionally, the determination in step S3006 can be made simply by comparing the state list with the determination list, and thus the determination can be made quickly. The countermeasure device (e.g., home gateway 20) can also automatically detect an unauthorized device control command.

Additionally, according to home gateway 20, determinations with respect to unauthorized control of electric lock 40, residential equipment, appliances, and so on can be made flexibly according to at least one of a state of a device operating in a home and a state of a resident. Home gateway 20 can also detect unauthorized communication to devices connected to local networks that are connected to the Internet through devices such as routers in places aside from homes, such as buildings, stores, factories, and vehicles.

Embodiment 2

In Embodiment 1 of the present disclosure, whether an appliance message is unauthorized was determined based on information pertaining to the operating state of each of appliances (state information) and each of instances of sensor information, or information obtained from each of appliances (including state information), state information of a resident of a home estimated based on each of instances of sensor information, or the like.

Here, as Embodiment 2 of the present disclosure, a configuration in which a detection mode of home gateway 20 is set based on information pertaining to an operating state of each of appliances, each of instances of sensor information, and information obtained from each of the appliances (including state information), or based on information of a resident living in the home estimated based on each of instances of sensor information, and whether an appliance message is unauthorized is determined based on the detection mode.

The unauthorized communication detection system according to Embodiment 2 of the present disclosure will be described hereinafter.

2. Details of Embodiment 2

An unauthorized communication detection system according to the present disclosure will be described, with reference to the drawings, as Embodiment 2 of the present disclosure. Note that the same reference signs will be used for constituent elements having the same functions as in Embodiment 1 of the present disclosure, and detailed descriptions thereof will be omitted.

The overall configuration of the unauthorized communication detection system is the same as in Embodiment 1 of the present disclosure, and will therefore not be described in detail.

2.1 Configuration of Home Gateway 20a

Figure 9:
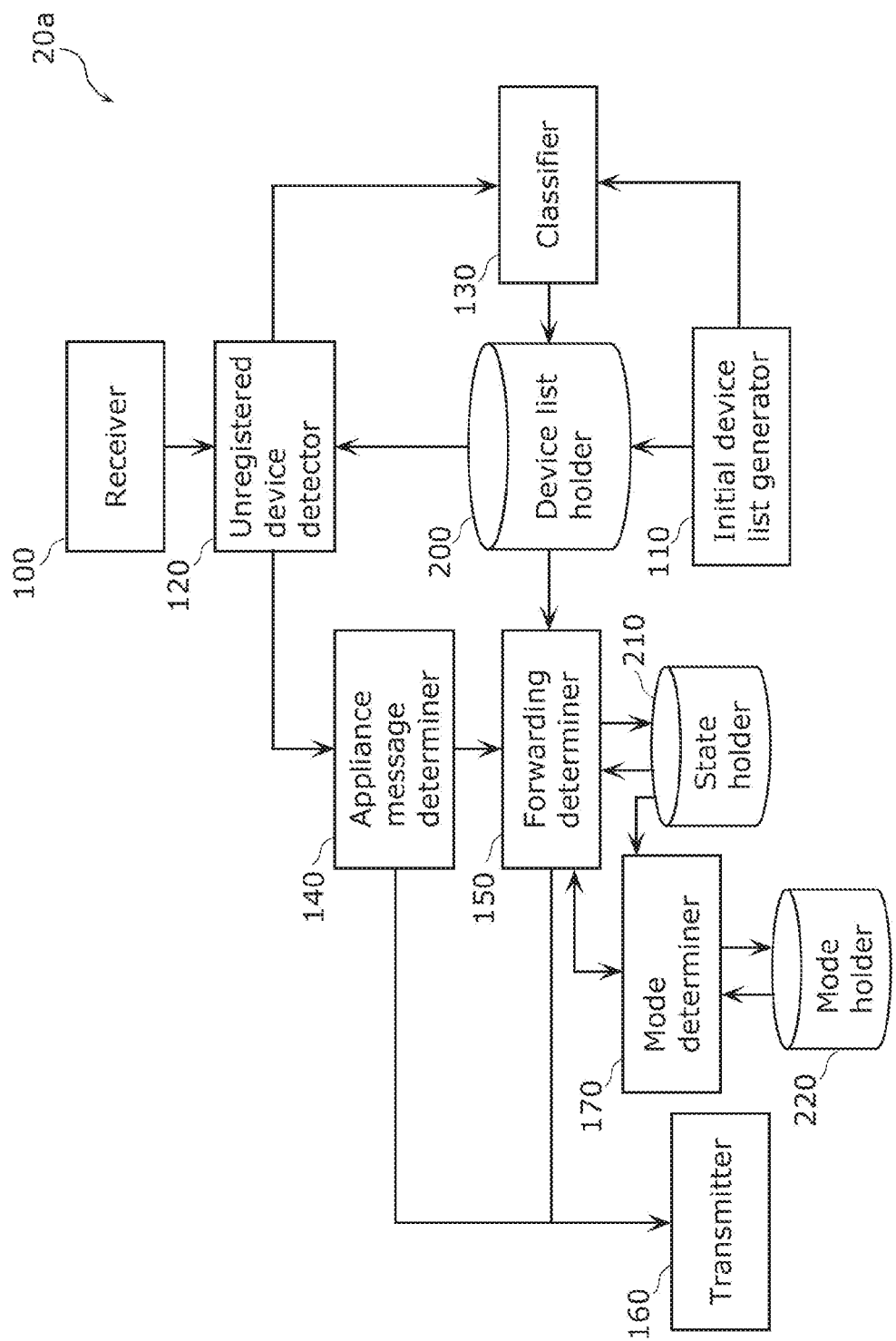
FIG. 9 is a block diagram of a home gateway according to Embodiment 2.

FIG. 9 is a block diagram of home gateway 20a according to Embodiment 2 of the present disclosure. The same reference signs will be used for constituent elements having the same functions as in Embodiment 1, and detailed descriptions thereof will be omitted or simplified.

As illustrated in FIG. 9, home gateway 20a includes receiver 100, initial device list generator 110, unregistered device detector 120, classifier 130, appliance message determiner 140, forwarding determiner 150, transmitter 160, mode determiner 170, device list holder 200, state holder 210, and mode holder 220. The unauthorized communication detection system according to the present embodiment includes home gateway 20a instead of home gateway 20 of the unauthorized communication detection system according to Embodiment 1. Additionally, home gateway 20a of the unauthorized communication detection system according to the present embodiment includes mode determiner 170 and mode holder 220 in addition to the configuration of home gateway 20 of the unauthorized communication detection system according to Embodiment 1.

When appliance message determiner 140 determines that a received communication message (a received message) is an appliance message, forwarding determiner 150 determines whether or not to transmit (forward) that received message to a transmission destination denoted in the received message.

Forwarding determiner 150 obtains information pertaining to the transmission origin device from the received message, and obtains a device No. from a device list held by device list holder 200. For example, if the received message contains information pertaining to a state of the device that transmitted the message, forwarding determiner 150 obtains the information pertaining to the state and registers the state in a state list held by state holder 210. Additionally, if the received message contains sensor information, forwarding determiner 150 registers the sensor information in the state list. Furthermore, for example, if the received message contains information pertaining to the state of the device that transmitted the message, or contains sensor information, forwarding determiner 150 estimates a state of a resident living in the home from that information, or from that information and information registered in the state list, and registers the estimated state in the state list.

Forwarding determiner 150 requests mode determiner 170 to determine the mode of home gateway 20a.

If the received message includes command information pertaining to device control (the device control command), forwarding determiner 150 obtains mode information of home gateway 20a from mode determiner 170, further obtains the determination list from state holder 210, and determines, based on the determination list, whether it is okay to forward the received message including the device control command in the mode obtained from mode determiner 170.

FIG. 10 is a diagram illustrating an example of the determination list according to the present embodiment. FIG. 10 illustrates a determination list for a device control command instructing unlocking of electric lock 40.

As illustrated in FIG. 10, forwarding determiner 150 determines to unlock "OK (forwarding is okay)" if the mode obtained from mode determiner 170 (forwarding determination mode) is "active mode", and determines not to unlock ("NG (forwarding not okay)" if the mode is "non-active mode" or "away mode". Note that it is sufficient for the determination list to include at least "active mode" and "away mode". In the present embodiment, the determination list further includes "non-active mode".

In response to a request from forwarding determiner 150, mode determiner 170 determines the mode of home gateway 20a based on the state list held by state holder 210 and the mode determination list held by mode holder 220 (described later). Mode determiner 170 determines the mode of home gateway 20a by comparing the state of at least one of each device and a person in the home, listed in the state list, with the state of at least one of each device and a person in the home, listed in the mode determination list.

A case where the mode determination list held by mode holder 220 is the mode determination list illustrated in FIG. 11 will be described here, FIG. 11 is a diagram illustrating an example of the mode determination list according to the present embodiment.

For example, mode determiner 170 determines that home gateway 20a is in "non-active mode" when the state list held by state holder 210 has "ON" for device No. 1, "OFF" for device No. 2, "locked" for device No. 3, and "bedroom" for the resident, and mode holder 220 holds the mode determination list illustrated in FIG. 11.

State holder 210 holds the same state list as in Embodiment 1, and will therefore not be described here. State holder 210 provides the information in the state list to mode determiner 170 in addition to forwarding determiner 150.

Mode holder 220 holds the mode determination list and a past result determined by mode determiner 170. Mode holder 220 is realized by, for example, a Hard Disk Drive (HDD), semiconductor memory, or the like, but is not limited thereto.

Although forwarding determiner 150 determines whether it is okay to forward the device control command from the determination list, the configuration is not limited thereto. For example, forwarding determiner 150 may determine whether or not it is okay for the device to be controlled to execute the device control command.

"Active mode", "non-active mode", and "away mode" are described as modes in the determination list and the mode determination list, but the modes are not limited thereto. For example, as long as the mode can be identified, the modes may have different names, such as "home mode", or may simply be "mode 1" and "mode 2", "No. 1" and "No. 2", "1" and "2", "A" and "B", or the like. The number of modes is not limited to three, and may be two, or at least four. When there is a large number of modes, determinations can be made appropriately even in complex situations.

Note that mode determiner 170 may determine the mode of home gateway 20a based on a past mode held by mode holder 220 and the information in the state list. This makes it possible for mode determiner 170 to correctly determine the mode when, for example, the state is the same but it is necessary to change the current mode according to the immediately-previous or another past mode.

The determination list for a device control command instructing electric lock 40 to be unlocked is described as the determination list, but the determination list is not limited thereto. For example, the specific devices, instruction contents of the device control commands, and so on are not specified, and the determination list may be a determination list for the device control command instructing electric lock 40 to lock, a determination list for the device control command instructing the air conditioner to turn on and off, or a determination list for the device control command instructing a temperature change for the air conditioner.

Additionally, there may be a determination list for each of these device control commands. FIG. 12 is a diagram illustrating another example of the determination list according to the present embodiment.

As illustrated in FIG. 12, the determination list may be a determination list for a specific device control command (an unlock command instructing electric lock 40 to unlock, in FIG. 12) and another device control command (aside from the unlock command).

For example, the device control command includes one of an unlock command for unlocking electric lock 40 and another command aside from the unlock command. In active mode, both the unlock command and the other command are transmitted to electric lock 40. If mode determiner 170 has determined the mode to be active mode, forwarding determiner 150 determines to transmit both the unlock command and the other command to electric lock 40. In non-active mode, of the unlock command and the other command, only the other command is transmitted to electric lock 40. If mode determiner 170 has determined the mode to be non-active mode, forwarding determiner 150 determines to transmit only the other command, of the unlock command and the other command, to electric lock 40. Additionally, in away mode, neither the unlock command nor the other command are transmitted to electric lock 40. If mode determiner 170 has determined the mode to be away mode, forwarding determiner 150 determines to transmit neither the unlock command nor the other command to electric lock 40.

Additionally, there may be a determination list for each device type, or there may be a combination of these. Additionally, the determination list may be a determination list grouped by device type, such as "air conditioner" or "electric lock", a determination list grouped by room, such as air conditioner 41 and lighting 42 in the living room, or a determination list for individual devices, such as grouped by device No.

The mode determination list holds the status of each device in each of the modes, but the mode determination list is not limited thereto. The mode determination list may be a mode determination list grouped by device type, such as "air conditioner" or "electric lock", or a mode determination list grouped by room, such as air conditioner 41 and lighting 42 in the living room, or may define the mode according to the state information of each device or the state of a resident estimated from sensor information.

FIG. 13 is a diagram illustrating another example of the mode determination list according to the present embodiment.

As illustrated in FIG. 13, the modes may be defined based on whether a resident is or is not present in the home (present/away) and whether a resident in the home is or is not active (sleeping or the like) (moving/still). Mode determiner 170 may determine that the mode of home gateway 20a is active mode when the first information indicates that a person is present in the home and that person is moving, and may determine that the mode of home gateway 20a is non-active mode when the first information indicates that a person is present in the home and that person is not moving. "Moving" is an example of a person being active, and means, for example, moving a part or all of the body by at least a predetermined amount. "Not moving" is an example of a person not being active, and means, for example, moving a part or all the body by less than the predetermined amount. "Not moving" may, for example, be that the person is sleeping.

Note that mode determiner 170 may determine whether a resident is or is not present in the home (present/away) and whether the resident in the home is active or not active (asleep or the like) (moving/not moving) based on, for example, whether a motion sensor installed in the home detects a person or detects that a person is moving, or may determine these items by analyzing an image or video from a camera installed in the home. Additionally, mode determiner 170 may also determine the above by having all residents carry a transmitter, such as an RF tag, and using a receiver, such as an RF receiver installed in the home, to receive information from a sensor mounted on the transmitter and make the determination by analyzing whether the transmitter is in the home and whether the transmitter is moving. Additionally, mode determiner 170 may also determine the above by having all residents carry a receiver, installing a transmitter in the home, and notifying a server or a controller in the home, such as home gateway 20, of signals received by the receiver, by ascertaining the movement of the residents using an indoor positioning system, or through another method.

Additionally, mode determiner 170 may also determine whether a person is present/away and moving/not moving from information which makes it possible to determine whether people are actually in the house or information which makes it possible to determine that people are moving, i.e., from sensor information obtained from each appliance and the like (e.g., information from a refrigerator open/closed sensor, information from window or door open/closed sensor, water usage amounts in the kitchen or bathrooms, room temperature, humidity, chemical concentrations such as carbon dioxide concentration or changes in these concentrations).

2.2 Operations of Device Control Command Monitoring System

Operations of a device control command monitoring system include (1) main processing, (2) classification processing, and (3) determination processing.

The processing of (1) and (2) is the same as in Embodiment 1 and will therefore not be described here.

The processing of (3) will be described hereinafter with reference to the drawings.

2.2.1 Operations in Determination Processing

Figure 14:
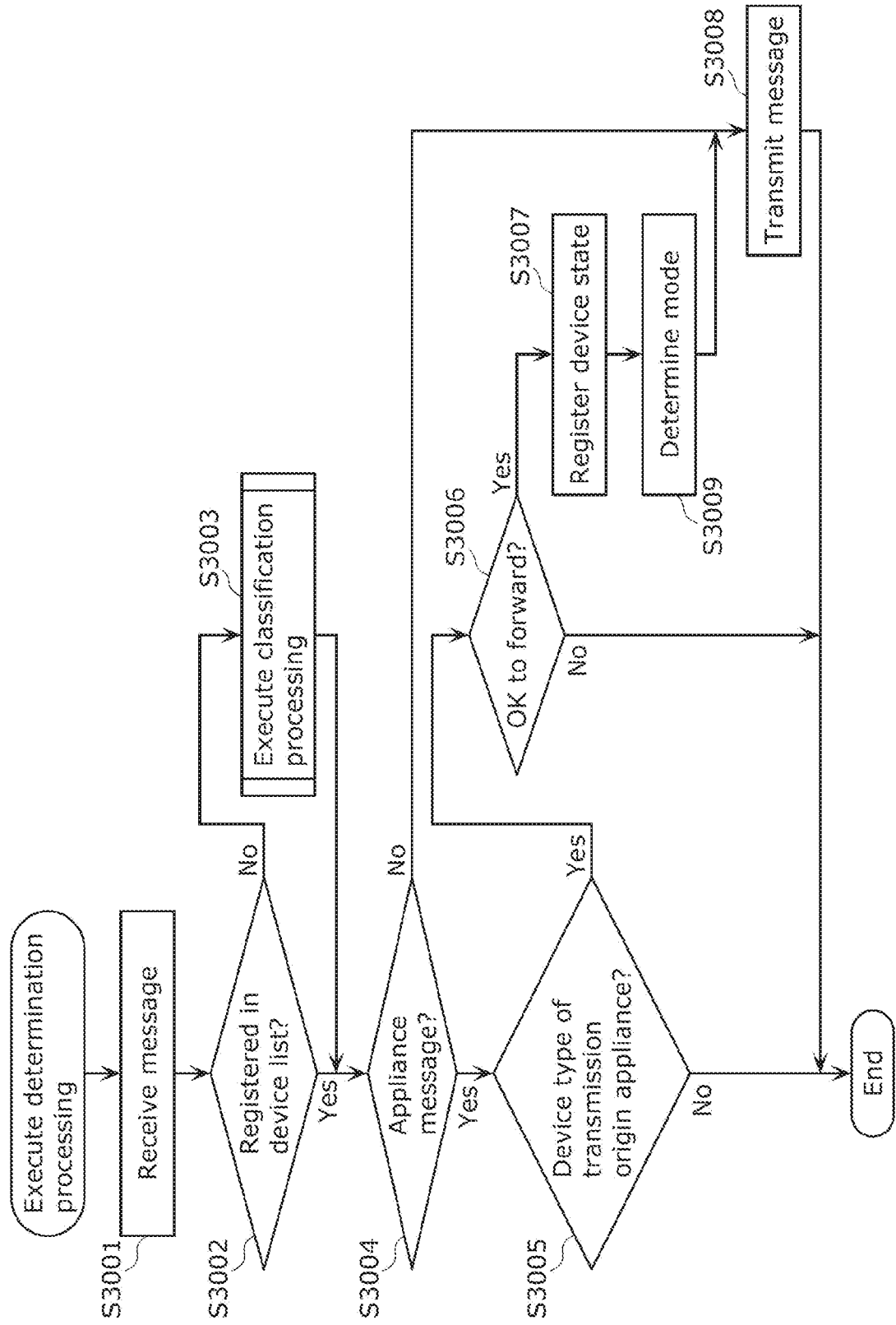
FIG. 14 is a flowchart illustrating an example of determination processing of the home gateway according to Embodiment 2.

FIG. 14 is a flowchart illustrating an example of the determination processing of home gateway 20*a* according to Embodiment 2 of the present disclosure.

The processing of step S3001 to step S3008 is the same processing as that in Embodiment 1 and will therefore not be described here. Note that if the transmission origin device is determined to be an "appliance" in step S3005 (Yes in S3005) and the received message contains a device control command, forwarding determiner 150 obtains, from mode determiner 170, the mode of home gateway 20*a* at that point in time, and a determination list pertaining to each control command of the devices controlled by the device control command (see FIG. 10, for example), and determines whether it is okay to forward that device control command (S3006). The mode obtained in step S3006 is a mode determined in step S3009 the previous time the processing illustrated in FIG. 14 was executed. In step S3006, forwarding determiner 150 according to the present embodiment determines whether or not to transmit the device control command to electric lock 40 based on the mode of home gateway 20*a* determined in the previous instance of step S3009.

Forwarding determiner 150 determines to transmit the device control command to electric lock 40 if the mode of home gateway 20*a* is active mode (Yes in S3006), and determines not to transmit the device control command to electric lock 40 if the mode of home gateway 20*a* is away mode. Additionally, forwarding determiner 150 may determine not to transmit the device control command to electric lock 40 if the mode of home gateway 20*a* is non-active mode as well.

Note that if a predetermined period has passed since the processing illustrated in FIG. 14 was last performed, the processing of step S3009 may be performed between the current steps S3005 and S3006. For example, in the case of "Yes" in step S3005, forwarding determiner 150 may determine whether to determine the mode of home gateway 20*a* before step S3006 based on whether the predetermined period has passed since the previous time the processing illustrated in FIG. 14 was executed.

Forwarding determiner 150 requests mode determiner 170 to determine the mode of home gateway 20*a* after updating the information in the state list held by state holder 210 with the information included in the received message received in step S3007. Mode determiner 170 compares the state list held by state holder 210 with the mode determination list held by mode holder 220, determines which mode home gateway 20*a* is currently in (S3009), and causes mode holder 220 to hold that mode.

It can be said that in step S3009, mode determiner 170 determines the mode of home gateway 20*a* based on the state list. Mode determiner 170 determines that the mode is active mode if it can be determined that a person is present in the home based on the state list, and determines that the mode is away mode if it can be determined that a person is not present in the home based on the state list. Additionally, mode determiner 170 may further determine that the mode of home gateway 20*a* is active mode when the state list indicates that a person is present in the home and that person is active, and may determine that the mode of home gateway 20*a* is non-active mode when the state list indicates that a person is present in the home and that person is not active. Step S3009 is an example of such a step of determining a forwarding determination mode.

Forwarding determiner 150 requests transmitter 160 to transmit a message, and in step S3008, transmitter 160 transmits the message.

2.3 Effects of Embodiment 2

In the present embodiment, the state list is updated and the mode is determined each time a message including information necessitating an update to the information in the state list is received, and when a message including a device control command is received, it is determined whether it is okay to execute or forward the device control command based on information of the mode.

Accordingly, when a message including a device control command is received, home gateway 20*a* need not refer to the large amount of information in the state list, and can instead efficiently perform the determination processing simply by referring to the information on the mode. Additionally, even if the information in the state list is the same, home gateway 20*a* can change the mode according to the previous state (mode), which makes it possible to efficiently perform the determination processing even under complex conditions.

3. Other Variations

The present disclosure is of course not limited to the embodiments described above, and variations on the embodiments conceived by one skilled in the art and embodiments implemented by combining constituent elements from different other embodiments, for as long as they do not depart from the essential spirit thereof, fall within the scope of the present disclosure. For example, variations such as those described below are also included in the present disclosure.

(1) In each of the foregoing embodiments, as the unauthorized communication detection system, the Internet and each device in the home are connected mainly to home gateway 20 or home gateway 20*a* (also referred to as "home gateway 20 and the like" hereinafter). However, the connection method of each device is not limited thereto. For example, the configuration may be that illustrated in FIG. 15 or FIG. 16, or may be another configuration.

Figure 15:
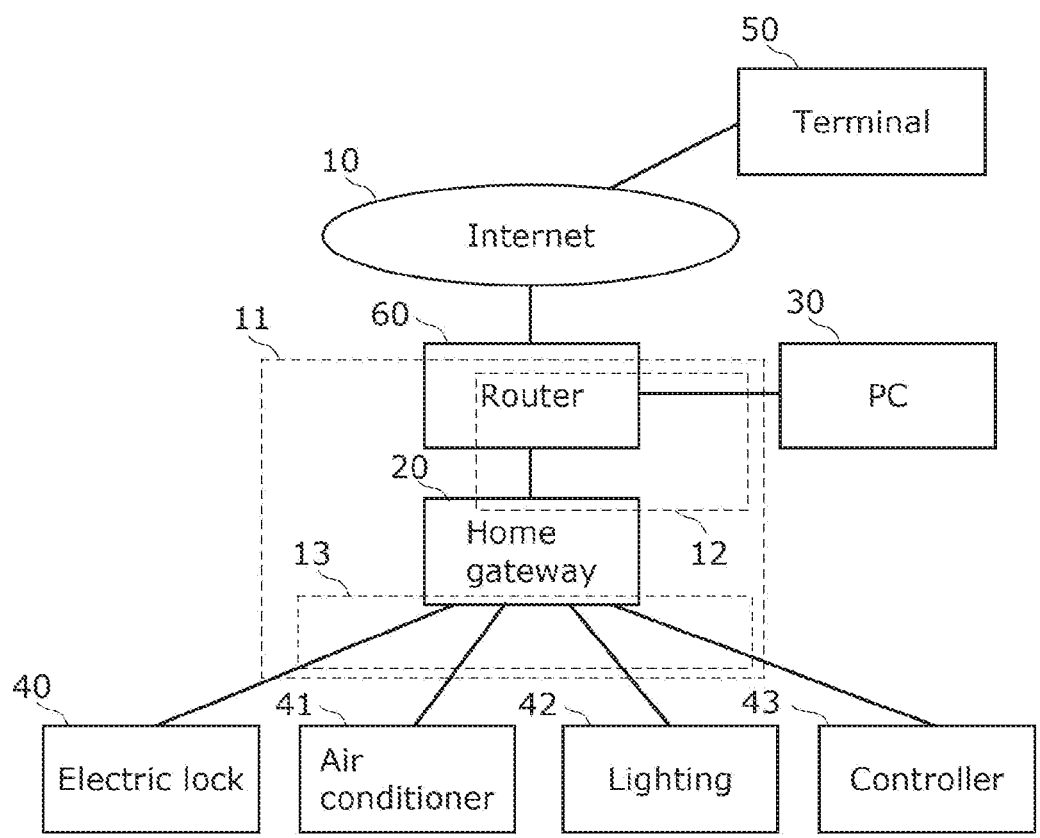
FIG. 15 is a diagram illustrating an example of the overall configuration of an unauthorized communication detection system according to Variation 1.

FIG. 15 is a diagram illustrating an example of the overall configuration of an unauthorized communication detection system according to Variation 1 on the foregoing embodiments.

As illustrated in FIG. 15, the unauthorized communication detection system include Internet 10, home network 11, IT device network 12, appliance network 13, home gateway 20, PC 30, electric lock 40, air conditioner 41, lighting 42, controller 43, terminal 50, and router 60. Although Internet 10 and PC 30 are directly connected to home gateway 20 in FIG. 1, here, Internet 10 and PC 30 are connected to router 60, and router 60 and home gateway 20 are connected.

Electric lock 40, air conditioner 41, lighting 42, controller 43, and router 60 are connected to home gateway 20, which mediates communication among those connected devices. Home gateway 20 has two types of connection ports, i.e., a connection port for connecting a communication line of IT device network 12 and a connection port for connecting a communication line of appliance network 13. In FIG. 15, there is one connection port for IT device network 12 (an IT device connection port) and four connection ports for appliance network 13 (appliance connection ports), with router 60 connected to the IT device connection port and appliances such as electric lock 40, air conditioner 41, lighting 42, and controller 43 connected to the appliance connection ports. Whether each connection port is an IT device connection port or an appliance connection port may be determined in advance, settable by a user, or determined automatically by home gateway 20. As a method for automatic determination, for example, home gateway 20 may determine that a connection port to which a device classified by classifier 130 as an "appliance" is connected is an "appliance connection port"; or may determine that a connection port to which a device classified by classifier 130 as a "non-appliance" is an "IT device connection port"; or may determine, based on communication messages transmitted and received by each device, that a connection port to which a device transmitting and receiving appliance messages is connected is an "appliance connection port" and other connection ports are "IT device connection ports"; or may use a different method.

Router 60 is a device for connecting Internet 10 to home network 11. Home gateway 20 and PC 30 are connected to router 60, and home gateway 20 or PC 30 communicate via router 60 when wishing to communicate with a server on Internet 10, Terminal 50 may also be connected to router 60.

Figure 16:
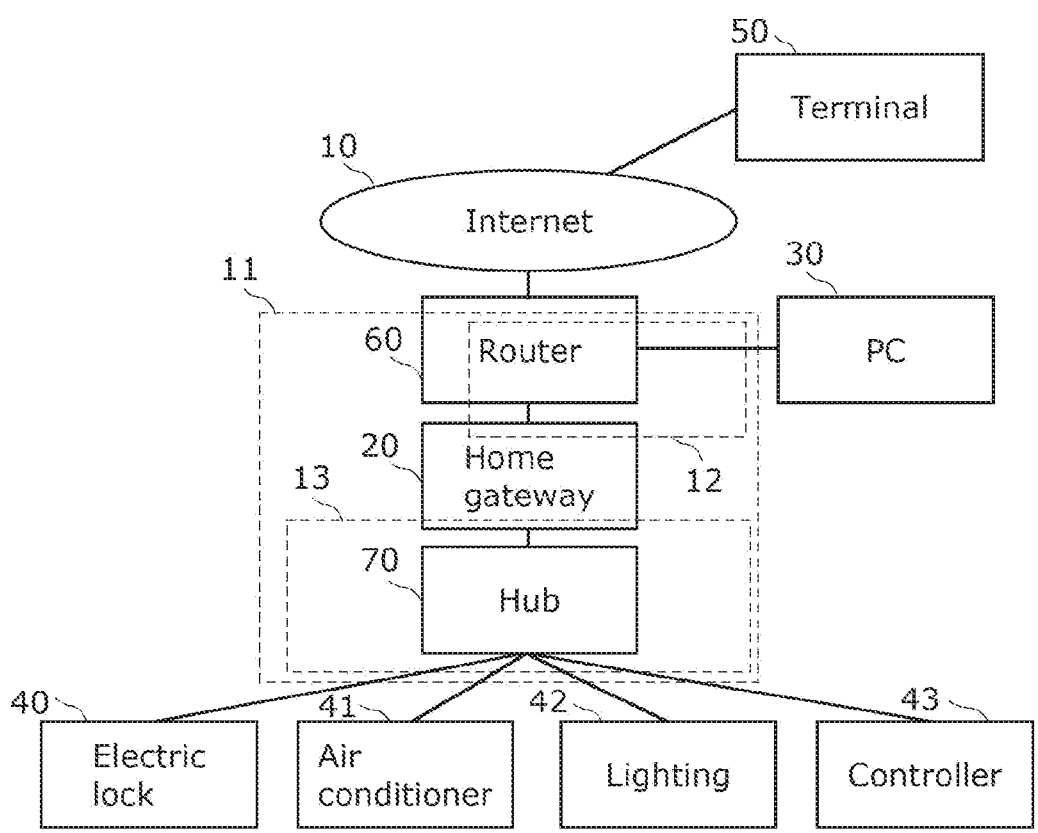
FIG. 16 is a diagram illustrating another example of the overall configuration of the unauthorized communication detection system according to Variation 1.

FIG. 16 is a diagram illustrating another example of the overall configuration of an unauthorized communication detection system according to Variation 1 on the foregoing embodiments.

As illustrated in FIG. 16, the unauthorized communication detection system includes Internet 10, home network 11, home gateway 20, PC 30, electric lock 40, air conditioner 41, lighting 42, controller 43, terminal 50, router 60, and hub 70. The difference from FIG. 15 is whether each appliance is directly connected to home gateway 20 or connected via hub 70.

Router 60 and hub 70 are connected to home gateway 20. Home gateway 20 has one IT device connection port and one appliance connection port, with router 60 connected to the IT device connection port and hub 70 connected to the appliance connection port. Whether each connection port is an IT device connection port or an appliance connection port may be determined in advance, settable by a user, or determined automatically by home gateway 20.

Home gateway 20a, electric lock 40, air conditioner 41, lighting 42, and controller 43 are connected to hub 70, which relays communication.

In the case of the configuration in FIGS. 15 and 16, the device list, the state list, the determination list, the mode determination list, and the like may include information on the connection port. For example, by including information on the connection port through which the device control command is received in the determination list, whether to allow the forwarding of the device control command can be determined for each connection port. Furthermore, by including information on the connection port for each device in the state list, the determination list, the mode determination list, and the like, a state or a mode can be determined as a different state or a different mode when the connection port to which the device is connected is different.

Through this, the determination can be made according to the connection port to which the device is connected, which enables more flexible determinations. Additionally, home gateway 20 and the like can detect that an appliance has been connected to IT device network 12 or that a device aside from an appliance such as PC 30 has been connected to appliance network 13, and notify the user to that effect. By performing operations for connecting devices to the appropriate networks in response to the notification, the user can connect the devices to the appropriate networks. Additionally, when a device control command that unauthorizedly controls an appliance has been transmitted from a non-appliance device connected to IT device network 12, if the connection port that receives that received message is the IT device connection port, the device control command can be determined to be unauthorized. Additionally, even if the location where a device is installed is a location better for connection to IT device network 12, that device can be allowed to transmit device control commands to appliances on appliance network 13 at the user's discretion even if the device is an appliance, which enables a flexible network configuration.

(2) Although the foregoing embodiments describe registering all devices connected to home network 11 in the initial device list during the main processing, the configuration is not limited thereto. For example, only the classification processing (S1002) and the determination processing (S1003) may be performed, without performing the processing of generating the initial device list (S1001), or only the determination processing (S1003) may be performed, without generating the initial device list (S1001) and performing the classification processing (S1002).

Figure 17:
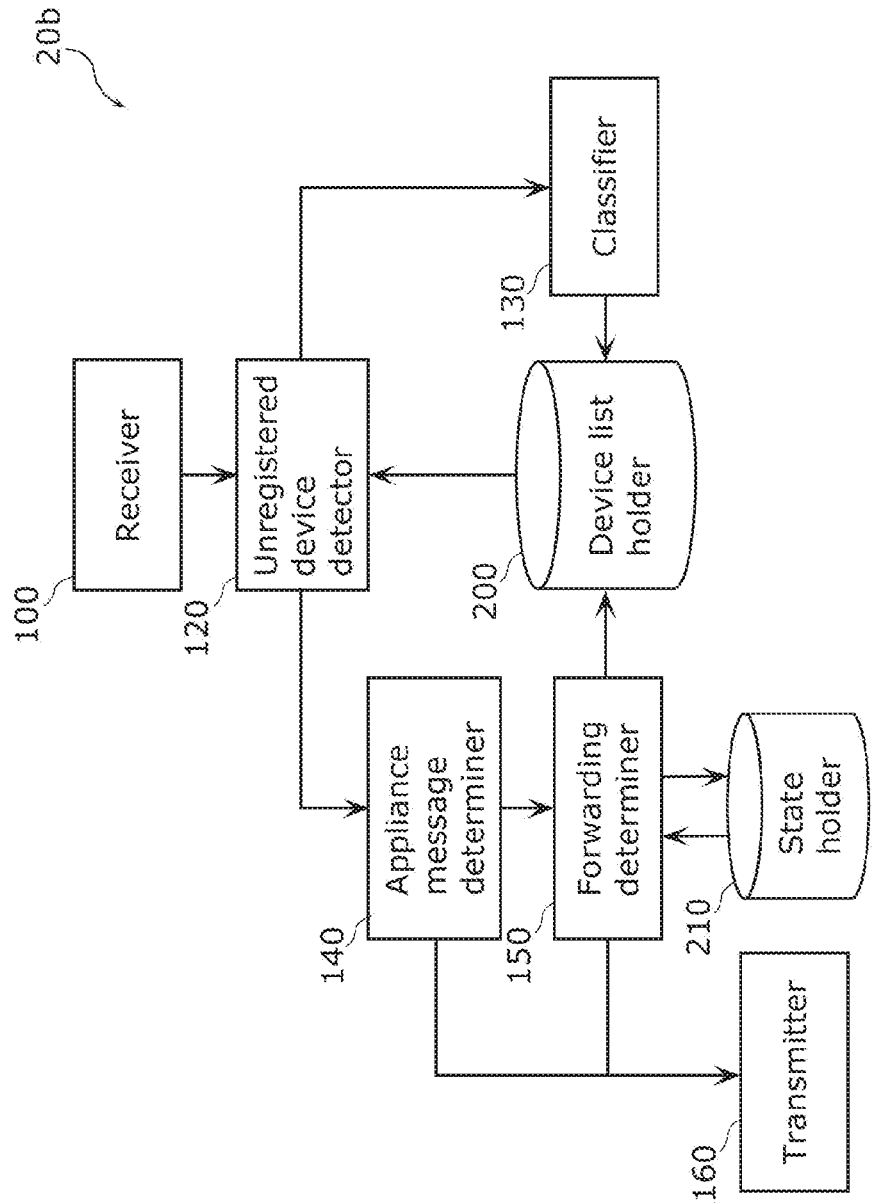
FIG. 17 is a block diagram of a home gateway according to Variation 2.
Figure 18:
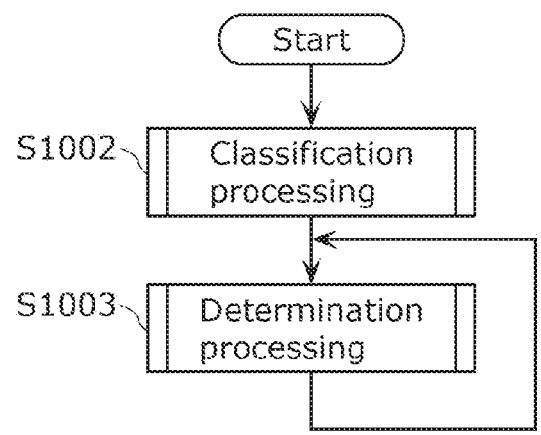
FIG. 18 is a flowchart illustrating an example of main processing of the home gateway according to Variation 2.
Figure 19:
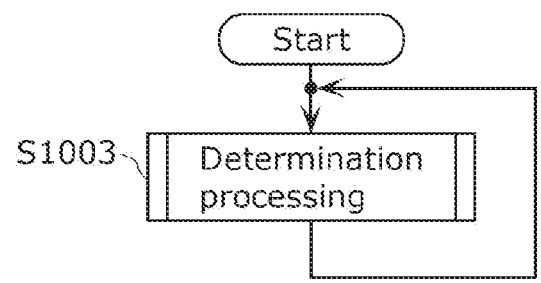
FIG. 19 is a flowchart illustrating another example of main processing of the home gateway according to Variation 2.

FIG. 17 is a block diagram of home gateway 20b according to Variation 2 on the foregoing embodiments. FIG. 18 is a flowchart illustrating an example of main processing of home gateway 20b according to Variation 2 on the foregoing embodiments. FIG. 19 is a flowchart illustrating another example of main processing of home gateway 20b according to Variation 2 on the foregoing embodiments.

As illustrated in FIG. 17, home gateway 20b has, for example, a configuration in which initial device list generator 110 has been removed from the configuration of home gateway 20 according to Embodiment 1 of the present disclosure (see FIG. 2).

According to this home gateway 20b, the main processing is as indicated by the flowchart in FIG. 18 or FIG. 19. The same configuration changes and processing changes can be made in other embodiments and variations as well.

This makes it possible to reduce the processing time and bus load at the time of initial startup, which makes it possible to protect appliances connected to home network 11 immediately after home gateway 20b starts up.

Figure 20:
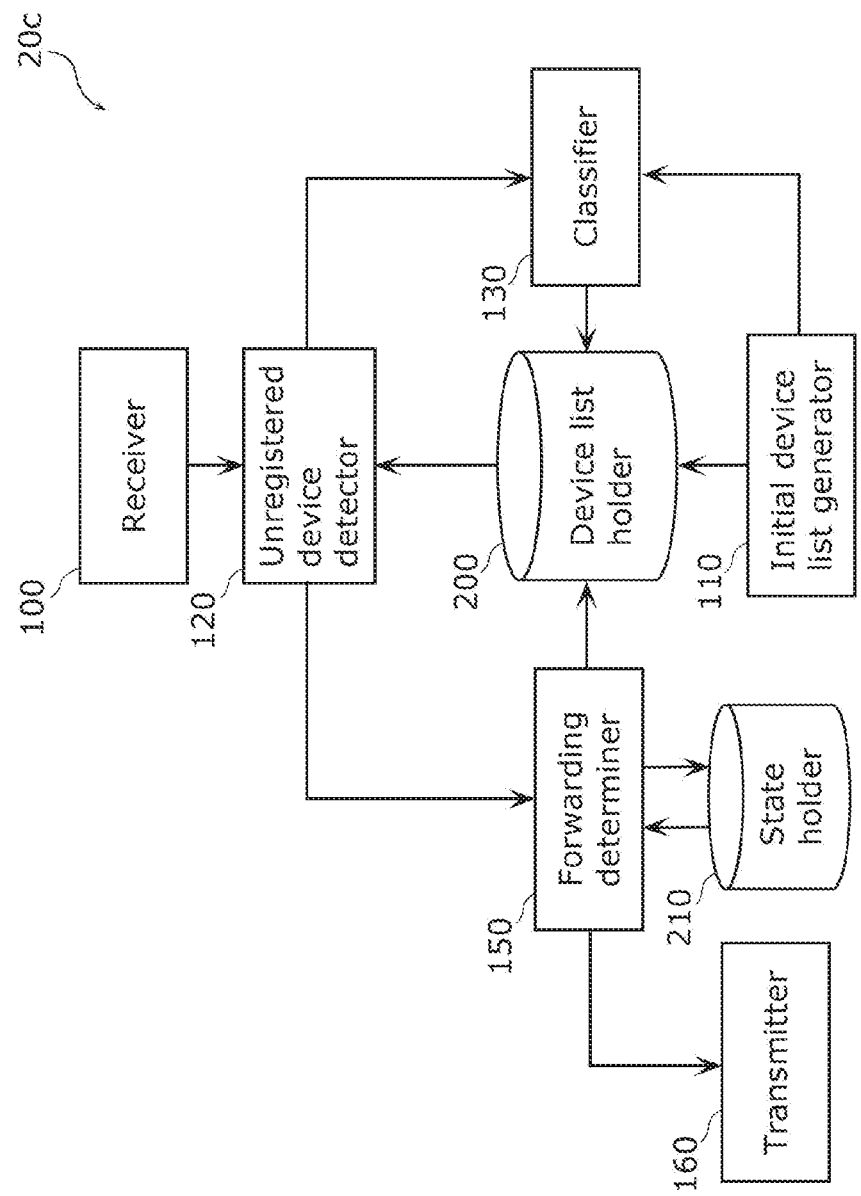
FIG. 20 is a block diagram of a home gateway according to Variation 3.
Figure 21:
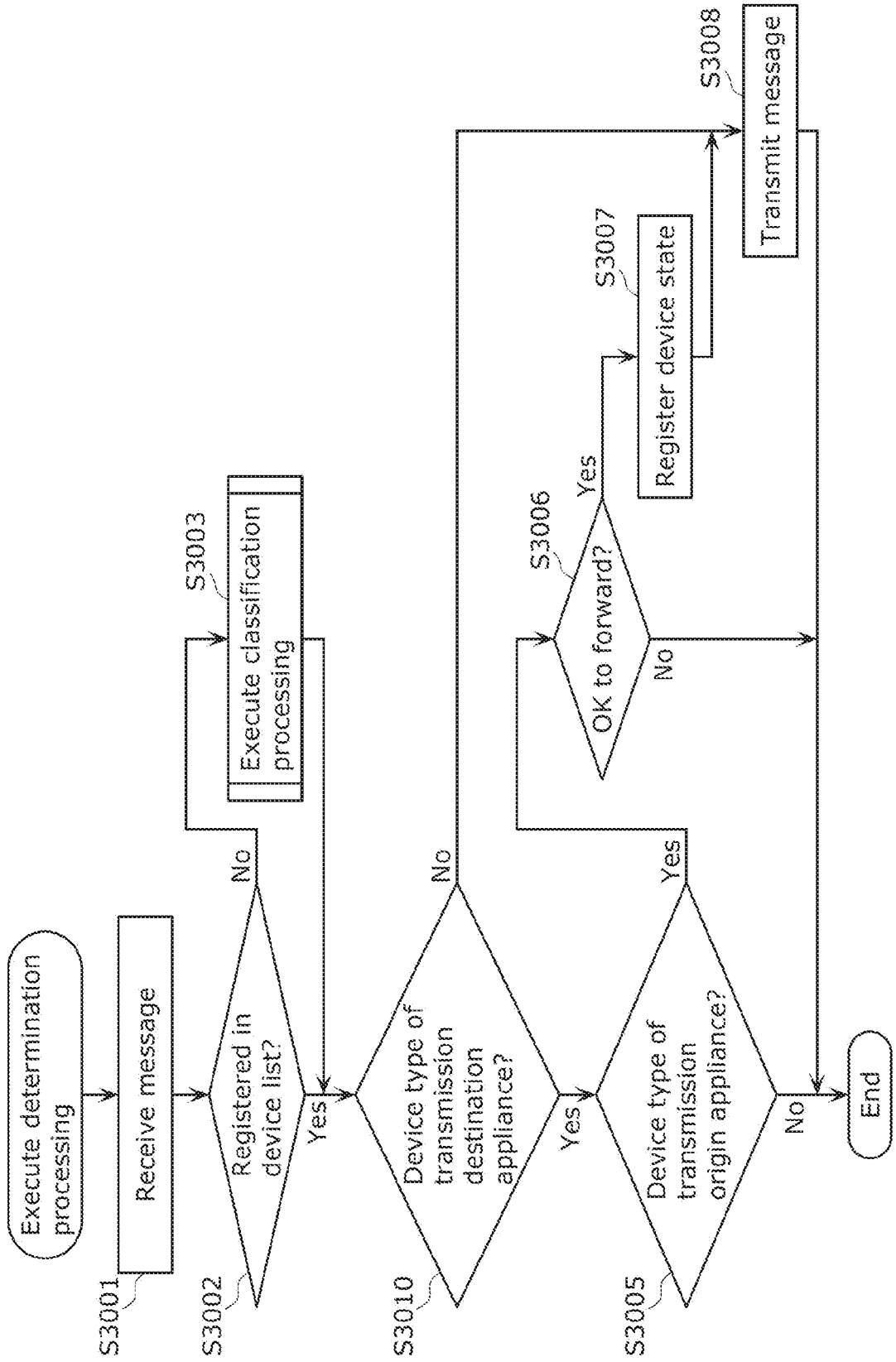
FIG. 21 is a flowchart illustrating an example of determination processing of the home gateway according to Variation 3.

(3) Although each of the foregoing embodiments describe home gateway 20 as determining whether or not the received message is an appliance message and forwarding determiner 150 as making a determination only when the received message is an appliance message, the configuration is not limited thereto. Forwarding determiner 150 may make a determination for all instances of communication. FIG. 20 is a block diagram of home gateway 20c according to Variation 3 on the foregoing embodiments. FIG. 21 is a flowchart illustrating an example of determination processing of home gateway 20c according to Variation 3 on the foregoing embodiments.

As illustrated in FIG. 20, home gateway 20c has, for example, a configuration in which appliance message determiner 140 has been removed from the configuration of home gateway 20 according to Embodiment 1 of the present disclosure (see FIG. 2).

Additionally, as illustrated in FIG. 21, the determination processing no longer includes the step (S3004) of determining whether the received message is an appliance message in the determination processing of Embodiment 1 of the present disclosure (see FIG. 6), and instead, forwarding determiner 150 may determine whether to transmit the message based on, for example, information of the transmission origin and the transmission destination of the received message. The same configuration changes and processing changes can be made in other embodiments and variations as well. Forwarding determiner 150 may determine whether to transmit the communication message based on, for example, the connection port over which the communication message was received (reception port), the connection port to which the communication message is to be transmitted (transmission destination port), or the like; may determine whether to transmit the communication message based on information on the reception port and the transmission destination; or may determine whether to transmit the communication message based on the reception port, the transmission destination, and whether the transmission origin device is allowed.

Through this, home gateway 20c can prevent the transmission of an unauthorized device control command even when it is difficult to determine from the received message whether that message is an appliance message. In addition, by limiting only messages from non-appliances to appliances, where the possibility of attacks is high, and not restricting other communication, home gateway 20c can effectively prevent attacks from non-appliances to appliances. Furthermore, home gateway 20c can generate the state list including messages aside from appliance messages, update the state information, and the like, which makes it possible to set complex conditions in the determination of the device control command and respond in a flexible manner. Home gateway 20c has the same effects when determining the mode as well.

Figure 22:
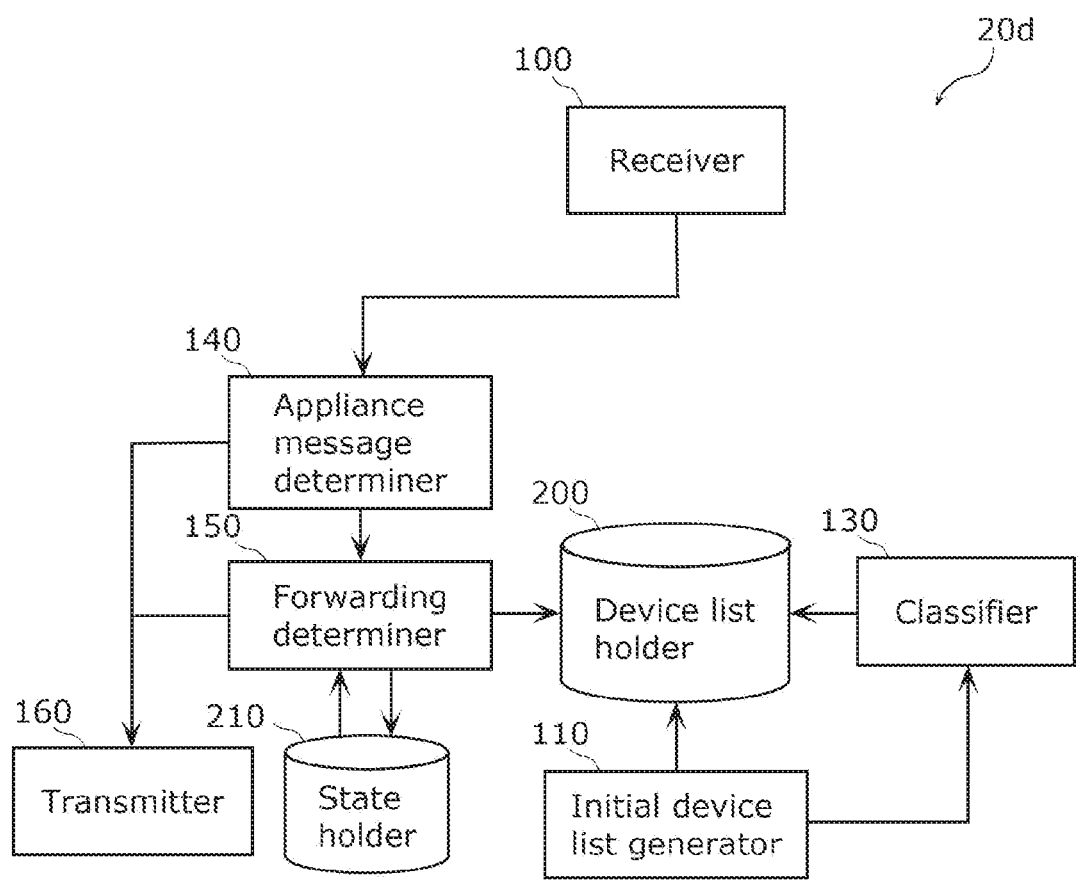
FIG. 22 is a block diagram of a home gateway according to Variation 4.
Figure 23:
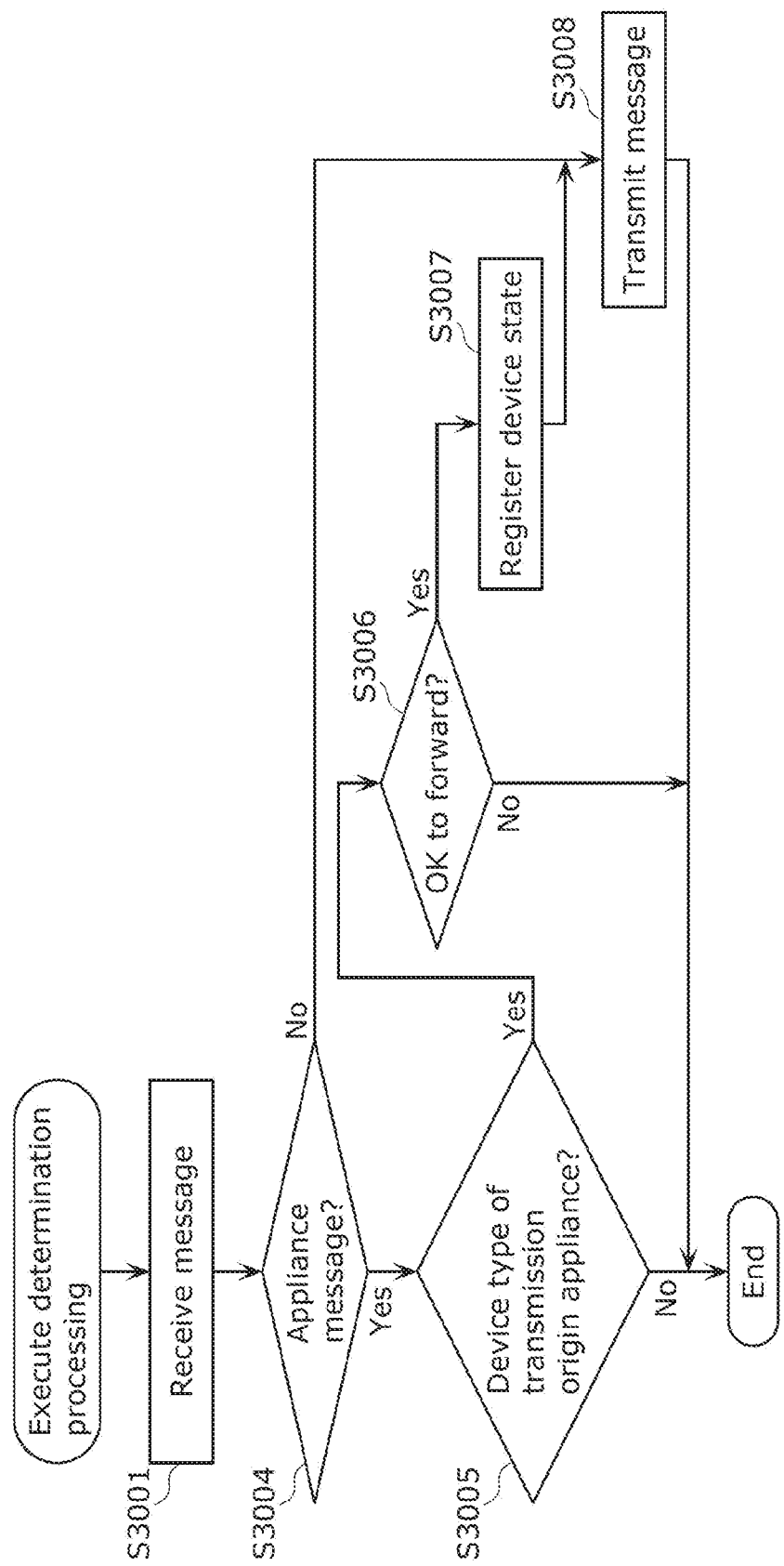
FIG. 23 is a flowchart illustrating an example of determination processing of the home gateway according to Variation 4.

(4) Although each of the foregoing embodiments described unregistered device detector 120 as determining whether or not the transmission origin of the received communication message is registered in the device list, and additionally registering the transmission origin when the transmission origin is not registered, but the configuration is not limited thereto. FIG. 22 is a block diagram of home gateway 20d according to Variation 4 on the foregoing embodiments. FIG. 23 is a flowchart illustrating an example of determination processing of home gateway 20d according to Variation 4 on the foregoing embodiments.

As illustrated in FIG. 22, home gateway 20d need not include unregistered device detector 120. As illustrated in FIG. 23, with such a home gateway 20d, in the determination processing, steps S3002 and S3003 can be eliminated.

Accordingly, with home gateway 20d, even if an unauthorized appliance is newly added to home network 11, that appliance cannot communicate, which makes home network 11 more secure.

Figure 24:
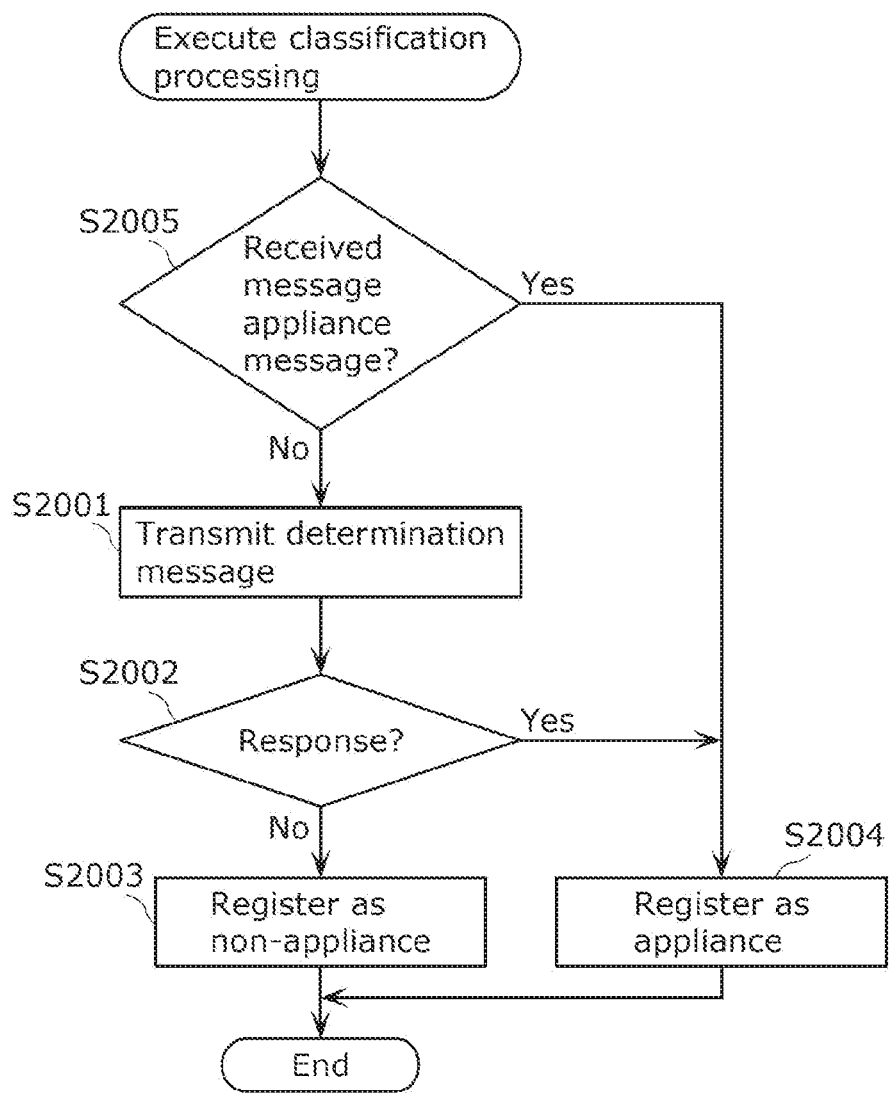
FIG. 24 is a flowchart illustrating an example of classification processing according to Variation 5.

(5) Although the foregoing embodiments described classifying a device by transmitting a determination message during the classification processing, the configuration is not limited thereto. FIG. 24 is a flowchart illustrating an example of classification processing according to Variation 5 on the foregoing embodiments.

As illustrated in FIG. 24, classifier 130 may determine whether the received message is an appliance message (S2005), and if the message is an appliance message (Yes in S2005), may register the transmission origin device as an appliance (S2004).

Through this, home gateway 20 or the like can classify a device without transmitting the determination message, which makes it possible to reduce the network load.

Figure 25:
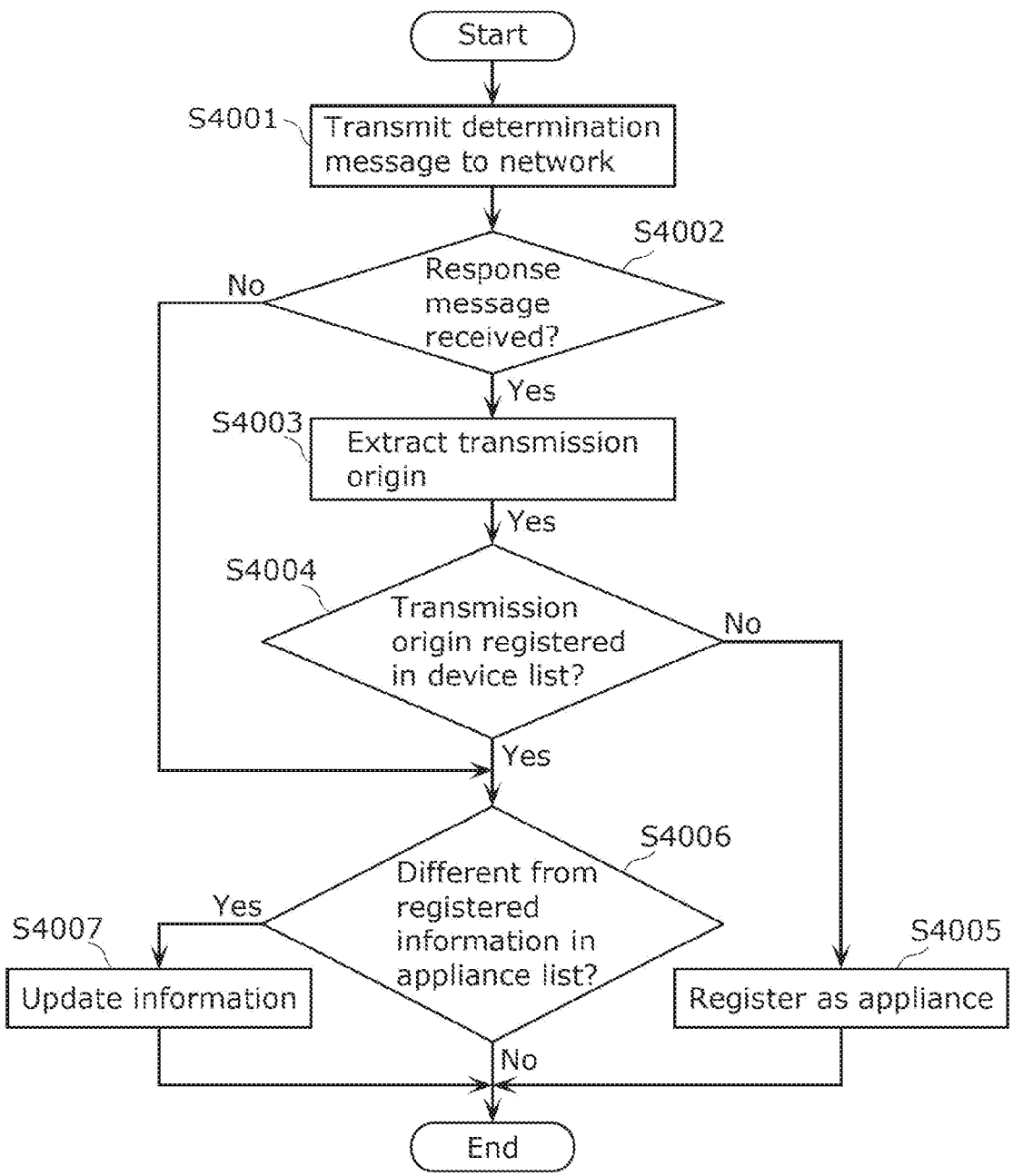
FIG. 25 is a flowchart illustrating an example of classification update processing according to Variation 6.

(6) Although the foregoing embodiments described performing the classification processing during the initial startup of home gateway 20 or the like, when the transmission origin of the received communication message is not registered in the device list, or the like, the configuration is not limited thereto. FIG. 25 is a flowchart illustrating an example of classification update processing according to Variation 6 on the foregoing embodiments.

As illustrated in FIG. 25, home gateway 20 or the like may further perform classification update processing for updating the classifications. In the classification update processing, first, classifier 130 transmits the determination message to the network (S4001). Next, classifier 130 determines whether or not a response message has been received in response to the determination message (S4002). When a response message is received in step S4002 (Yes in S4002), classifier 130 extracts the transmission origin from the response message (S4003). Classifier 130 then determines whether the extracted transmission origin is registered in the device list (S4004).

The transmission origin not being registered in the device list in step S4004 (No in S4004) means that a new device has been connected, and thus classifier 130 registers that device in the device list as an appliance (S4005). Additionally, if a response message has not been received before a set amount of time has passed in step S4002 (No in S4002), and if the transmission origin is not registered in the device list in step S4004 (Yes in S4004), classifier 130 determines whether or not there is a difference from the registration information in the device list (S4006).

If there is a difference from the registration information in the device list in step S4006 (Yes in S4006), classifier 130 updates the information in the device list (S4007). Additionally, if the registration information in the device list is the same in step S4006 (No in S4006), classifier 130 ends the classification update processing. Here, in step S4007, before updating the device list, classifier 130 may inquire with the user and update only the registration information of allowed devices.

This makes it possible for home gateway 20 or the like to flexibly handle even cases where a device is added or deleted. Additionally, by inquiring with the user, home gateway 20 and the like can register only the devices that the user has allowed, making it possible to create a more secure environment.

(7) The foregoing embodiments described state holder 210 as holding both the state list and the determination list, but the configuration is not limited thereto. FIG. 26 is a diagram illustrating an example of a determination list according to Variation 7 on the foregoing embodiments.

As illustrated in FIG. 26, the state list and the determination list may be held as a single list. In this case, the state of at least one of the devices and people corresponding to the state No. "now" indicated in FIG. 26 can be updated.

Through this, home gateway 20 and the like can centrally manage the current state and the determination list without the need to manage a plurality of lists, which makes it possible to simplify the determination processing performed in home gateway 20 and the like.

(8) In each of the foregoing embodiments, there is a determination list and a mode determination list, and "active mode", "non-active mode", and "away mode" are described as modes, but the configuration is not limited thereto. FIG. 27 is a diagram illustrating another example of a determination list according to Variation 8 on the foregoing embodiments.

As illustrated in FIG. 27, the determination list and the mode determination list may be one list, and there may be only two modes, namely "active mode" and "away mode".

Through this, home gateway 20 and the like can centrally manage the current state and the determination list without the need to manage a plurality of lists, which makes it possible to simplify the determination processing. In addition, home gateway 20 and the like can speed up the determination process by simplifying the number of modes to two.

(9) In each of the foregoing embodiments, "active mode", "non-active mode", and "away mode" are described as modes in the determination list and the mode determination list, but the modes are not limited thereto. FIG. 28 is a diagram illustrating an example of a mode determination list according to Variation 9 on the foregoing embodiments. FIG. 29 is a diagram illustrating another example of a determination list according to Variation 9 on the foregoing embodiments. For example, as illustrated in FIGS. 28 and 29, the modes of home gateway 20 and the like may further include "entrance mode" and "housesitting mode".

Here, "entrance mode" is a state where a person is near the entrance of the residence, and may be, for example, a state in which there is only a person near the entrance of the residence. "Entrance mode" may be a state in which all residents in the home are present near the entrance in order to go out, or may be a state in which all the residents are out but one resident has returned home and is outside the entrance. In either case, this is a state in which no one is in the home except for the area around the entrance. At this time, forwarding determiner 150 allows only an unlock command from a terminal present near the entrance (e.g., terminal 50), and does not allow control commands aside from the unlock command from the terminal present near the entrance, nor control commands, including unlock commands, from terminals not present near the entrance. "Near the entrance" may be, for example, a space where the entrance door is provided, or may be a range where the entrance door is visible. "Near the entrance" may also be a range within a predetermined distance (e.g., several meters) from the entrance door.

Note that, for example, the mode may be determined to be entrance mode when there is no one in the home and there is a person present only outside the entrance, or the mode may be determined to be the entrance mode when there is a person in the house but only inside the entrance.

For example, in step S3009 illustrated in FIG. 14, mode determiner 170 may further determine that the mode of home gateway 20 or the like is entrance mode when it can be determined, based on the state list, that there is a person only near the entrance of the residence.

Then, in step S3006 illustrated in FIG. 14, forwarding determiner 150 may determine not to transmit the unlock command when the mode of home gateway 20 or the like is entrance mode and the first device is a device not near the entrance.

Additionally, if the second device is installed in the entrance of the residence, and forwarding determiner 150 can further determine that a person is present only near the entrance of the residence in step S3006 based on the state list, forwarding determiner 150 may determine to transmit a communication message including a device control commands to electric lock 40.

Through this, when everybody is out but one of the residents has come home, home gateway 20 or the like allows an unlock command only from a terminal carried by the person who has come home (e.g., a smartphone or the like), which makes it possible to eliminate the inconvenience of a situation where home gateway 20 remains in "away mode" and the entrance door cannot be opened because unlock commands are not allowed. However, home gateway 20 or the like can prevent attacks such as air conditioner 41 or lighting 42 being unauthorizedly turned on in rooms that are difficult to check from the entrance, even when the residents are out.

Note that mode determiner 170 may determine whether all the residents in the home are near the entrance in order to go out, e.g., determine that the mode is "entrance mode" when a motion sensor installed in a room aside from the entrance does not detect a person, and only a motion sensor installed in the entrance detects a person. Mode determiner 170 may also ascertain who has gone out or come home by analyzing images from a camera installed at the entrance, and determine that the mode is "entrance mode" when all the people on the camera go out. In addition, it is possible to have all residents carry a transmitter such as an RF tag and continually track who has gone out or come home using receivers such as RF receivers installed inside and outside the entrance and in the home, and have mode determiner 170 determine that the mode is "entrance mode" when the person carrying a transmitter receiving a signal from the receiver goes out, which means that all residents are out. In addition, it is possible to have all residents carry a receiver, install a transmitter inside and outside the entrance and in the home, continually track who has gone out or come home by having the receiver notify a controller in the home, such as a server or home gateway 20, of received signals, and have mode determiner 170 determine that the mode is "entrance mode" when a person carrying a receiver receiving a signal from the transmitter installed in the entrance leaves and results in all people having left. Additionally, mode determiner 170 may ascertain the position of a resident using the indoor positioning system and determine that the mode is "entrance mode" when no one is in the home except near the entrance, or may determine whether all the residents in the home are near the entrance in order to go out using a method aside from the above.

Additionally, mode determiner 170 may determine whether a resident has come home and is outside the entrance while everyone is out using the same method as the above-described method for determining whether all residents who were in the home are near the entrance in order to go out, and may determine whether no one is in the home and someone is just outside the entrance. However, because the method using motion sensors cannot determine who is just outside the entrance, it is difficult to make the determination using only motion sensors. A method using Wi-Fi (registered trademark) can be used as another method to determine if one of the residents has returned home and is outside the entrance while everyone is out. For example, if a Wi-Fi access point (Wi-Fi AP) is installed in home network 11 and the Wi-Fi AP can communicate with a smartphone carried by a resident, when one of the residents has arrived outside the entrance, the Wi-Fi AP and the smartphone carried by the resident can communicate. Accordingly, mode determiner 170 may determine that the mode is "entrance mode" when the Wi-Fi AP and the smartphone carried by the resident become able to communicate, or may work with an outdoor positioning system (e.g., Global Positioning System (GPS) or the like) and determine that the mode is "entrance mode" when the resident is near the house. As another method for mode determiner 170 to determine whether all the residents who were in the home are near the entrance in order to go out, sensors may be attached to the shoes of the residents, and the mode may be determined to be "entrance mode" when all residents have put on theft shoes. In this case, if one person owns multiple pairs of shoes, mode determiner 170 determines that the resident has put on their shoes when the sensor attached to one of the shoes owned by the resident is making a response indicating that the resident has put on theft shoes. A combination of some of the above methods may also be used for the determination.

"Entrance mode" has been described as a state where all residents who were in the home are near the entrance in order to go out, or a state in which one resident comes home and is outside the entrance when all residents are out. However, entrance mode is not limited thereto. A state where all residents who were in the home are near the entrance in order to go out may be "active mode" or "non-active mode", and only a state in which one resident comes home and is outside the entrance when all residents are out may be "entrance mode"; or, a state where all residents who were in the home are near the entrance in order to go out may be "entrance mode", a state in which one resident comes home and is outside the entrance when all residents are out may be "away mode", and a physical key is used to unlock the door when the resident comes home instead of unlocking through home network 11. These may be switched as well.

This makes it possible for home gateway 20 or the like to be configured flexibly according to the residents' schedules, personal belongings, equipment in the home, and the like.

Meanwhile, "housesitting mode" is a state in which only children (an example of a person who is not allowed to control the at least two devices over home network 11) or the like, who do not unlock electric lock 40 over home network 11, are in the home. At this time, only control commands aside from the unlock command are allowed.

For example, mode determiner 170 may, in step S3009 indicated in FIG. 14, further determine the mode of home gateway 20 and the like to be housesitting mode when, based on the state list, there is a person in the home but the person is only a person who is not allowed to control the at least two devices over home network 11 (e.g., a child). Information pertaining to people who are not allowed to control the at least two devices over home network 11 is set in advance and held, for example, in state holder 210.

Then, in step S3006 indicated in FIG. 14, if the mode of home gateway 20 or the like is housesitting mode, among the unlock command and other commands aside from the unlock command, forwarding determiner 150 may determine to transmit only the other commands.

This makes it possible for home gateway 20 and the like to prevent the transmission of unauthorized unlock commands when electric lock 40 is unauthorizedly unlocked and the home is unauthorizedly entered by a suspicious person.

For example, intrusions by suspicious people can be reduced when only children or other people who cannot resist are in the home.

Note that mode determiner 170 may determine whether the state is one in which only a child who does not unlock the electric lock over home network 11 is in the home in, for example, the same manner as the determination for "entrance mode", i.e., continually track who has gone out and who has come home by analyzing images from a camera installed in the entrance and determining that the mode is "housesitting mode" when only the child has come home but a parent has not come home. Additionally, it is possible to have all residents carry a transmitter such as an RF tag, register whether a person is a child for each transmitter, and have mode determiner 170 determine that the mode is "housesitting mode" only when a transmitter registered as a child has come home. Additionally, it is possible to have all residents carry a receiver, install a transmitter inside and outside the entrance and in the home, register whether a person is a child for each receiver, and have mode determiner 170 determine that the mode is "housesitting mode" only when a receiver registered as a child has come home. Additionally, if a Wi-Fi access point (Wi-Fi AP) is installed on home network 11 and a smartphone carried by a resident can communicate with that Wi-Fi AP, mode determiner 170 may determine that the mode is "housesitting mode" when only a smartphone registered as a child can communicate with the Wi-Fi AP. Additionally, if the child does not carry a transmitter, a receiver, or a smartphone, mode determiner 170 may determine that the mode is "housesitting mode" when a transmitter, a receiver, or a smartphone is outside the home and a motion sensor in the home is responding, the electric lock of the entrance door is opened using a physical key, or the like. A combination of some of the above methods may also be used for the determination.

This makes it possible for home gateway 20 or the like to be make determinations flexibly in accordance with the positions of the child or the like, equipment in the home, and the like.

Although the person not allowed to control devices has been described as being a child, such a person is not limited to the child, and may be any person who cannot resist when a suspicious person unauthorizedly enters the home, such as an elderly person, a sick person, an injured person, or the like.

(10) In each of the foregoing embodiments, the mode of home gateway 20 is determined based on the state list held by state holder 210 and the mode determination list held by mode holder 220, but the configuration is not limited thereto.

Figure 30:
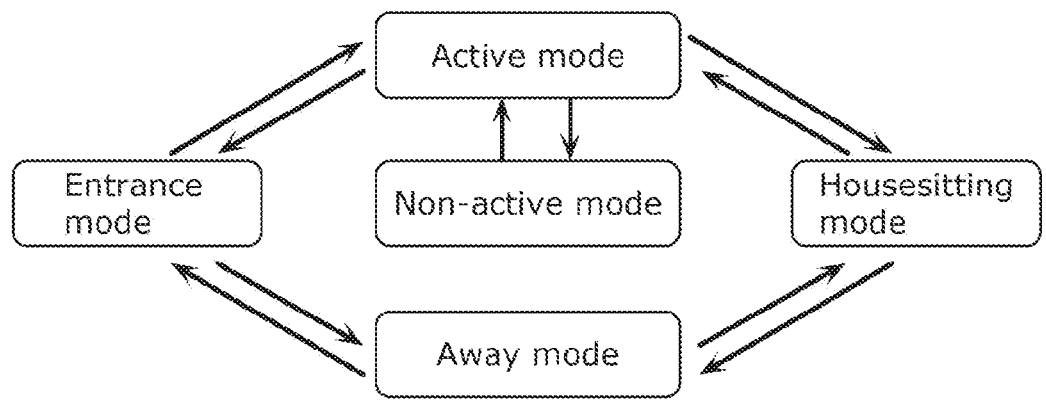
FIG. 30 is a diagram illustrating an example of mode transitions according to Variation 10.

FIG. 30 is a diagram illustrating an example of mode transitions according to Variation 10 on the foregoing embodiments.

As illustrated in FIG. 30, conditions for transitioning from one mode to another mode may be defined, and mode determiner 170 may determine the mode of home gateway 20 or the like according to those conditions. At this time, if the information pertaining to the state of the device, information on device control commands, or the like is information that does not match a condition for a mode transmission, home gateway 20 or the like may determine that that message is an unauthorized message and not forward the message. In addition to information pertaining to the state of the device, information on device control commands, or the like, an amount of time that has passed following a mode transition, an amount of time that has passed since the state of the device has changed, the amount of time that has passed since receiving the previous device control command, and so on may be included as conditions for mode transitions.

Through this, home gateway 20 or the like can set detailed conditions pertaining to mode transitions, which makes it possible to improve the detection rate of unauthorized messages, suppress erroneous detections, and the like.

Note that FIG. 30 is merely an example, and the modes, number of modes, method for mode transitions, and the like are not limited thereto. There may be modes aside from those indicated in FIG. 30, several of the modes may be omitted, or different mode transitions may be made.

Note that a transition from non-active mode to away mode and vice versa are unlikely to actually occur, and may therefore be prohibited. When transitioning from non-active mode to away mode and vice versa, forwarding determiner 150 may determine not to forward the received message to the second device.

(11) In the foregoing embodiments, forwarding determiner 150 and mode determiner 170 determined whether to forward a received message based on the state list holding the state of each device and the determination list pertaining to each of control commands for devices controlled by device control commands. Additionally, forwarding determiner 150 and mode determiner 170 determined the mode based on the state of each device, and determined whether to forward a received message according to which mode was in effect. However, the configuration is not limited thereto. Mode determiner 170 may determine whether to forward the received message, which mode is in effect, and whether to transmission the mode taking into account not only the state of each device, but also be amount of time that has passed after entering a certain state. For example, forwarding determiner 150 and mode determiner 170 may determine not to forward the received message when mode determiner 170 receives a device control command of "off" when a device is rarely turned on/off, and electric lock is rarely locked/unlocked, or the like in a short period of time, or receives a device control command of "on" when the amount of time that has passed since the previous time the device was on is shorter than a set amount of time, or when the amount of time that has passed since the previous time the device was off is shorter than a set amount of time. Alternatively, if lighting 42 in the entrance normally turns on immediately after electric lock 40 of the entrance door is unlocked, forwarding determiner 150 and mode determiner 170 may determine an anomalous state if lighting 42 in the entrance does not turn on even after a set amount of time has passed since electric lock 40 of the entrance door was unlocked.

(12) In each of the foregoing embodiments, mode determiner 170 sets the mode according to the mode determination list, but the configuration is not limited thereto. For example, if there is a security system for detecting whether a window, a door, or the like has been opened or dosed while the residents are out, and there is an "away setting" for detecting whether a window and a door has been opened or closed and a "home setting" for not detecting whether a window and a door has been opened or dosed, the mode of home gateway 20 may be changed in conjunction with the "away setting" and "home setting" of the security system; or, if there is a controller for home automation, and a command for collectively operating devices when going out or coming home, when going to sleep, or the like is made, the mode of home gateway 20 or the like may be changed in conjunction with that command, to transition to "away mode" when a collective operation is made when going out, to "active mode" when a collective operation is made when coming home, to "non-active mode" when a collective operation is made when going to sleep, or the like.

Through this, even in cases where the mode cannot be fully determined based only on the communication messages exchanged over home network 11, home gateway 20 or the like can make more accurate mode transitions by working in conjunction with other systems, the functions of other devices, and so on.

Note that home gateway 20 and the like is not limited to a security system or a controller for home automation, and may operate in conjunction with other systems or other devices; or, home gateway 20 or the like may include an inputter through which a resident can input the mode, and have the resident input the mode directly.

Figure 31:
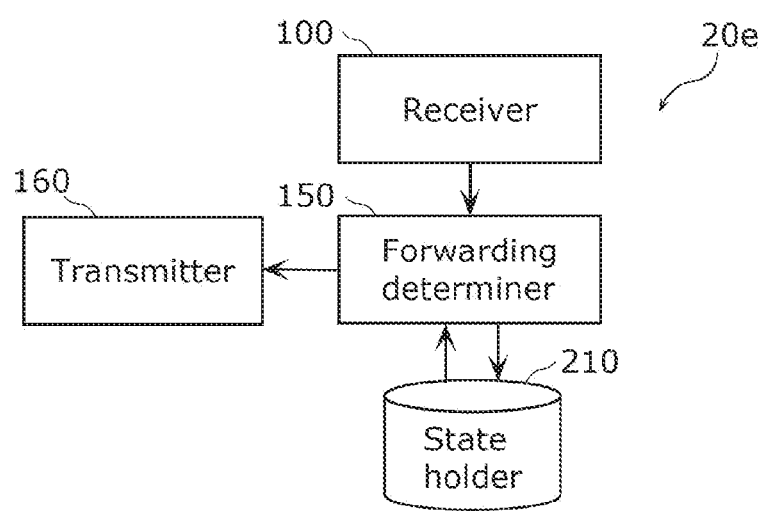
FIG. 31 is a block diagram of a home gateway according to Variation 10.
Figure 32:
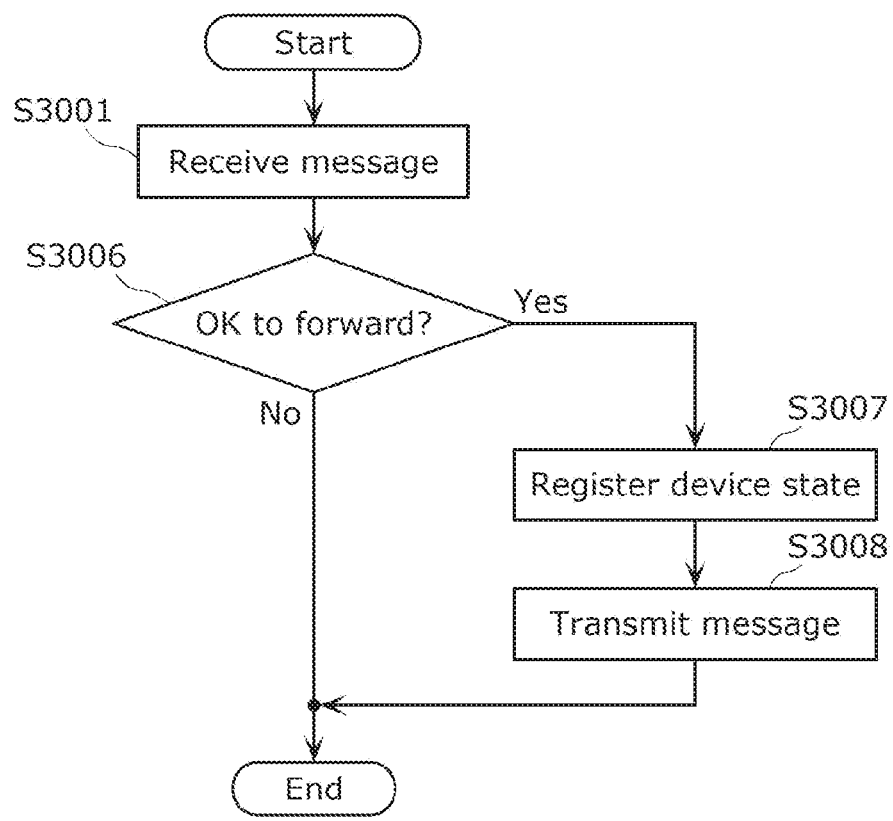
FIG. 32 is a flowchart illustrating an example of determination processing of a home gateway according to Variation 11.
Figure 33:
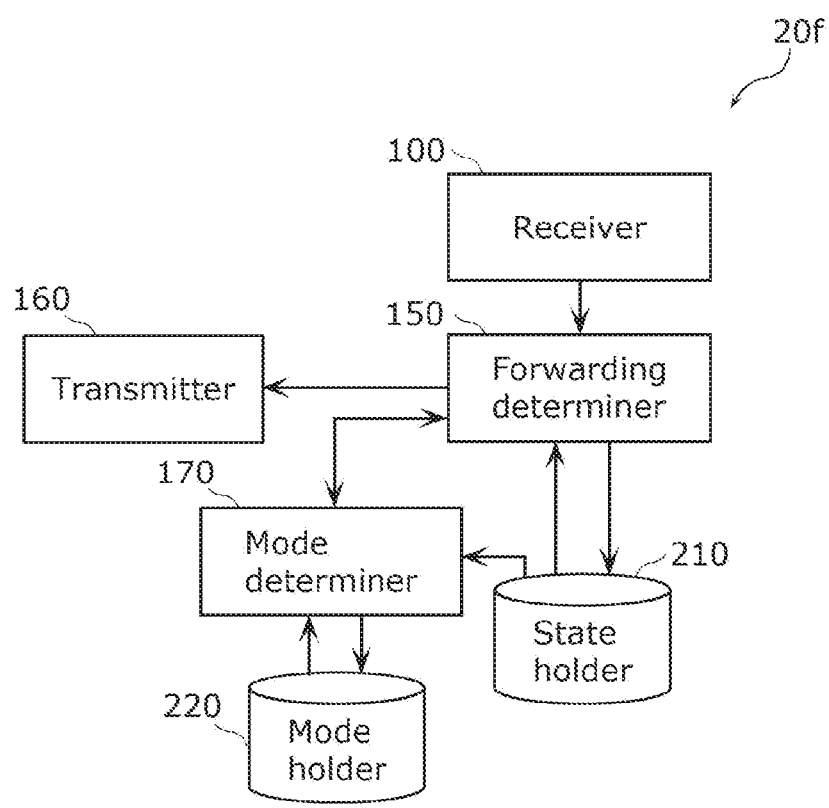
FIG. 33 is a block diagram of the home gateway according to Variation 11.
Figure 34:
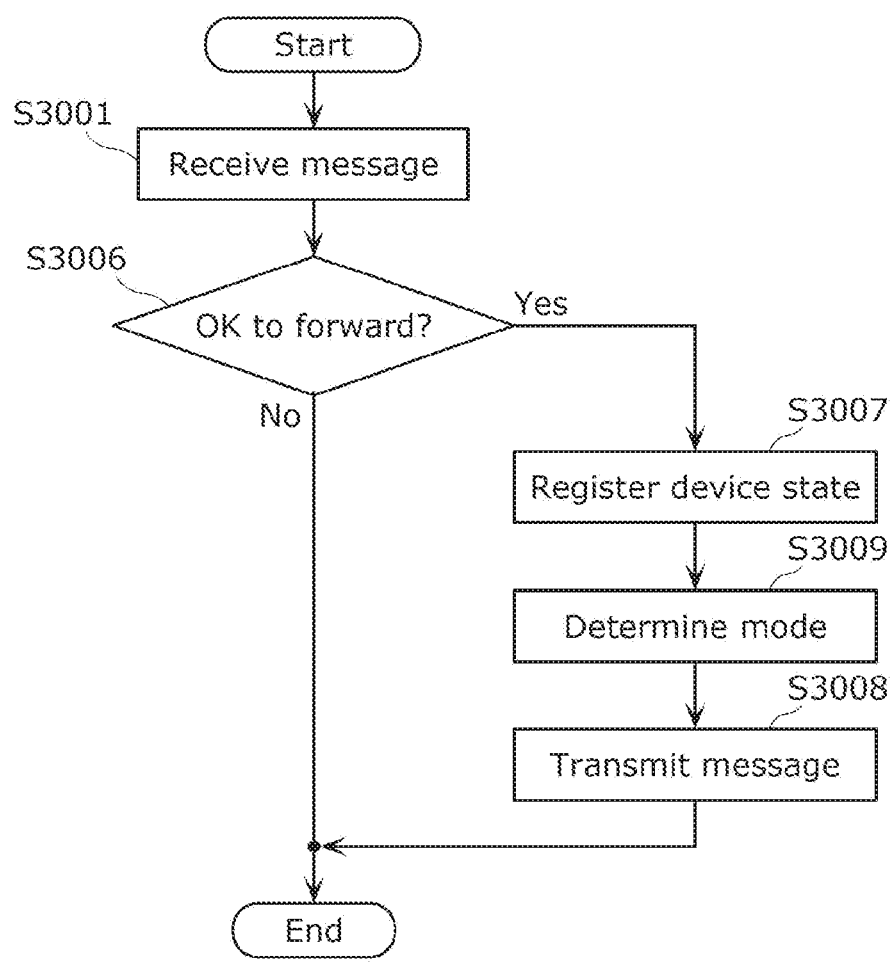
FIG. 34 is a flowchart illustrating an example of determination processing of the home gateway according to Variation 11.

(13) In each of the foregoing embodiments, home gateway 20 or the like includes receiver 100, initial device list generator 110, unregistered device detector 120, classifier 130, appliance message determiner 140, forwarding determiner 150, transmitter 160, device list holder 200 and state holder 210, or home gateway 20 includes receiver 100, initial device list generator 110, unregistered device detector 120, classifier 130, appliance message determiner 140, forwarding determiner 150, transmitter 160, mode determiner 170, device list holder 200, state holder 210, and mode holder 220, but the configurations are not limited thereto. FIG. 31 is a block diagram illustrating an example of the configuration of home gateway 20e according to Variation 11 on the foregoing embodiments. FIG. 32 is a flowchart illustrating an example of determination processing of home gateway 20e according to Variation 11 on the foregoing embodiments. FIG. 33 is a block diagram illustrating another example of the configuration of home gateway 20f according to Variation 11 on the foregoing embodiments. FIG. 34 is a flowchart illustrating an example of determination processing of home gateway 20f according to Variation 11 on the foregoing embodiments.

As illustrated in FIG. 31, home gateway 20e may include at least receiver 100, forwarding determiner 150, transmitter 160, and state holder 210.

In this case, as illustrated in FIG. 32, it is sufficient for the main processing to includes the determination processing (S1003); and it is sufficient for the determination processing to include the processing of receiving a message (S3001), determining whether to forward the received message based on the state of at least one of each device connected to home network 11 and a person in the home (S3006), and registering the device state as necessary (S3007) and transmitting the message (S3008) when it is okay to forward the message (Yes in S3006).

Additionally, as illustrated in FIG. 33, home gateway 20f may include at least receiver 100, forwarding determiner 150, transmitter 160, mode determiner 170, state holder 210, and mode holder 220.

In this case, as illustrated in FIG. 34, it is sufficient for the determination processing to include the processing of receiving a message (S3001), determining whether to forward the received message based on the state of at least one of each device connected to home network 11 and a person in the home (S3006), and registering the device state as necessary (S3007), determining the mode (S3009), and transmitting the message (S3008) when it is okay to forward the message (Yes in S3006).

(14) Although home gateway 20 or the like detects unauthorized communication in the foregoing embodiments, the configuration is not limited thereto. Unauthorized communication may be detected in an appliance such as electric lock 40 (including residential equipment), and whether to process (execute) a received message may then be determined. For example, when electric lock receives a device control command from another device instructing electric lock 40 to be unlocked, whether to execute the device control command and perform the processing for unlocking electric lock 40 may be determined.

Figure 35:
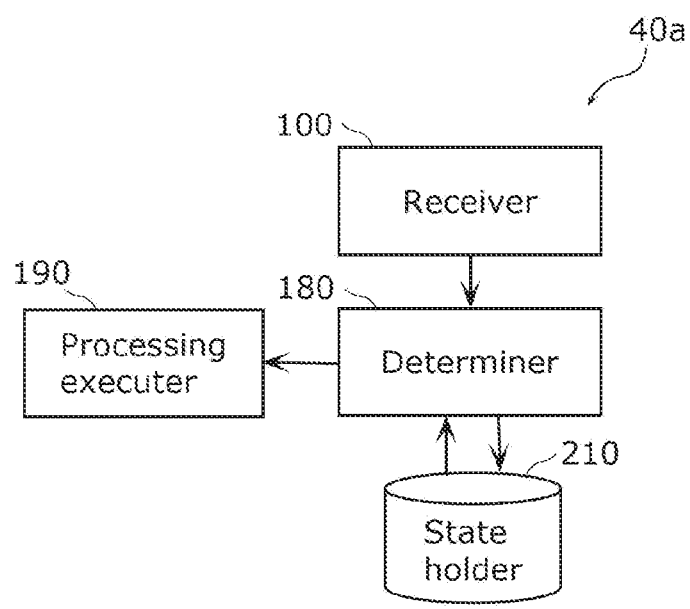
FIG. 35 is a diagram illustrating an example of the configuration of an electric lock according to Variation 12.
Figure 36:
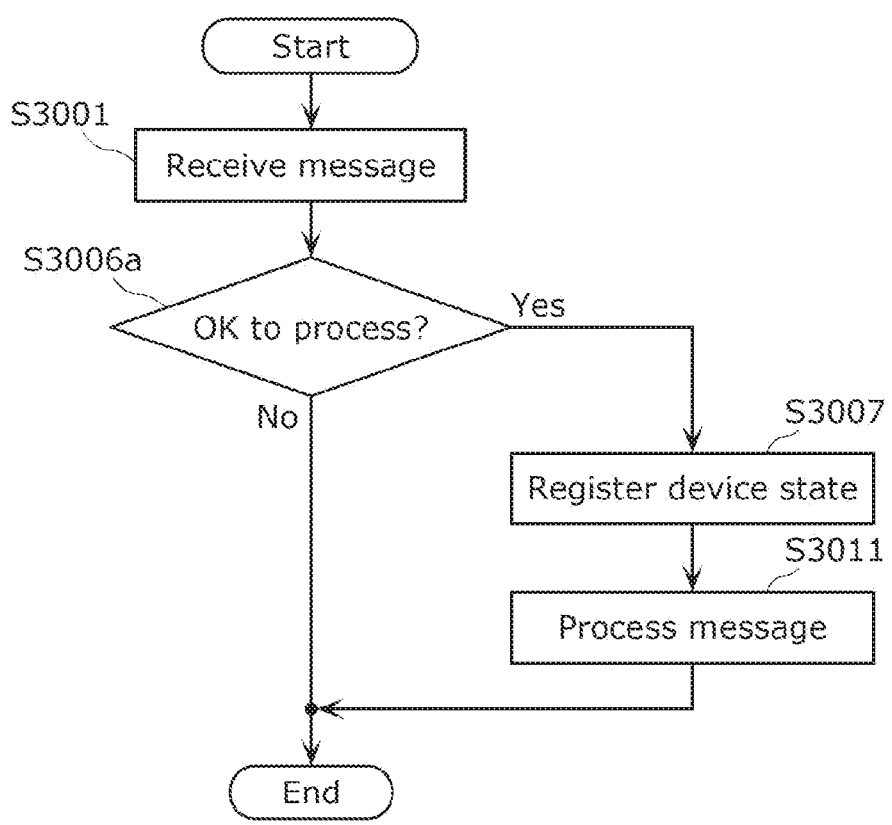
FIG. 36 is a flowchart illustrating an example of determination processing of the electric lock according to Variation 12.

FIG. 35 is a block diagram illustrating an example of the configuration of electric lock 40*a* according to Variation 12 on the foregoing embodiments. FIG. 36 is a flowchart illustrating an example of determination processing of electric lock 40*a* according to Variation 12 on the foregoing embodiments. Although the following will describe an example in which electric lock 40*a* has the configuration illustrated in FIG. 35, another device (e.g., air conditioner 41, lighting 42, or the like) may have the configuration illustrated in FIG. 35. For example, each of the at least two devices may have the configuration illustrated in FIG. 35.

The configuration of the appliance that detects unauthorized communication (e.g., electric lock 40*a*) is as illustrated in FIG. 35, for example. As illustrated in FIG. 35, electric lock 40 includes receiver 100, determiner 180, processing executer 190, and state holder 210. Here, determiner 180 performs the same processing as the processing through which forwarding determiner 150 determines whether to forward, and determines whether to process the received message based on the state list (an example of first information). Determiner 180 determines whether the device itself (e.g., electric lock 40*a*) is to execute the device control command as the determination as to whether to execute processing pertaining to the device control command. Additionally, processing executer 190 actually processes the received message. For example, processing executer 190 in electric lock 40*a* actually performs the processing of unlocking and locking.

Electric lock 40*a* according to the present variation functions as an unauthorized communication detection device that detects an unauthorized communication message on home network 11. Processing executer 190 is an example of an executer.

The determination processing in this configuration is as illustrated in FIG. 36. Here, in home gateway 20 or the like, whether it is okay to forward is determined in step S3006, but in this configuration, whether it is okay for electric lock 40*a* to process the received control command is determined (S3006*a*). The specific determination details are the same as in the foregoing embodiments and other variations, and will therefore not be described. In the determination in step S3006*a*, whether to execute is determined based on the state list held by state holder 210. Step S3006*a* is an example of determining whether to execute processing. In the case of "Yes" in step S3006*a*, processing for the received message is executed (S3011). Step S3011 is an example of a step of executing. In the executing step, operations of electric lock 40*a* may be controlled based on the device control command as the execution of the processing. Additionally, the processing of executing the device control command included in the communication message is an example of processing pertaining to the device control command.

Figure 37:
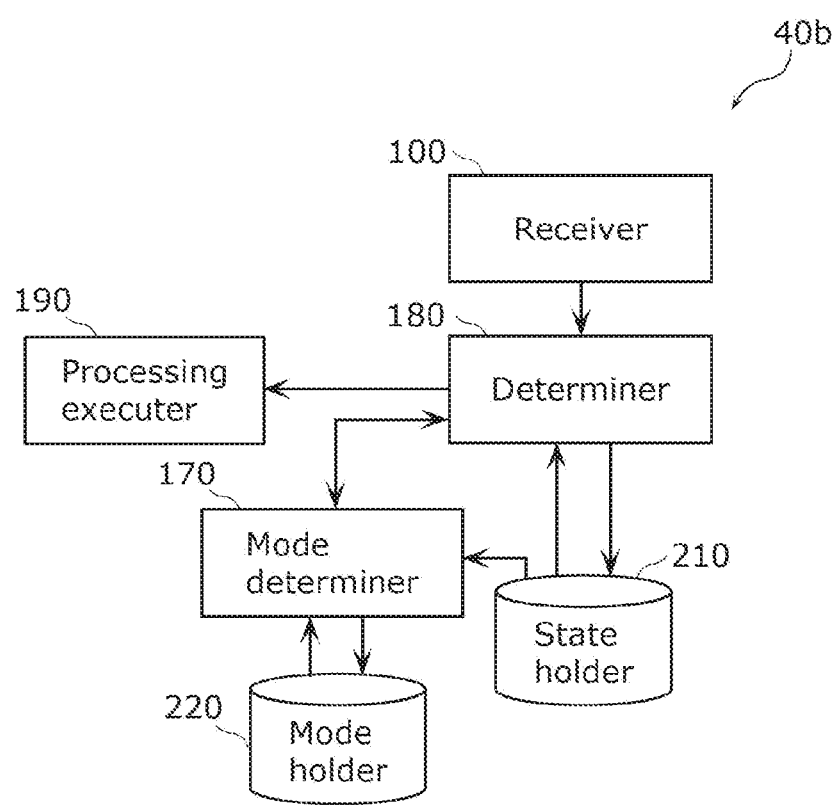
FIG. 37 is a diagram illustrating another example of the configuration of the electric lock according to Variation 12.
Figure 38:
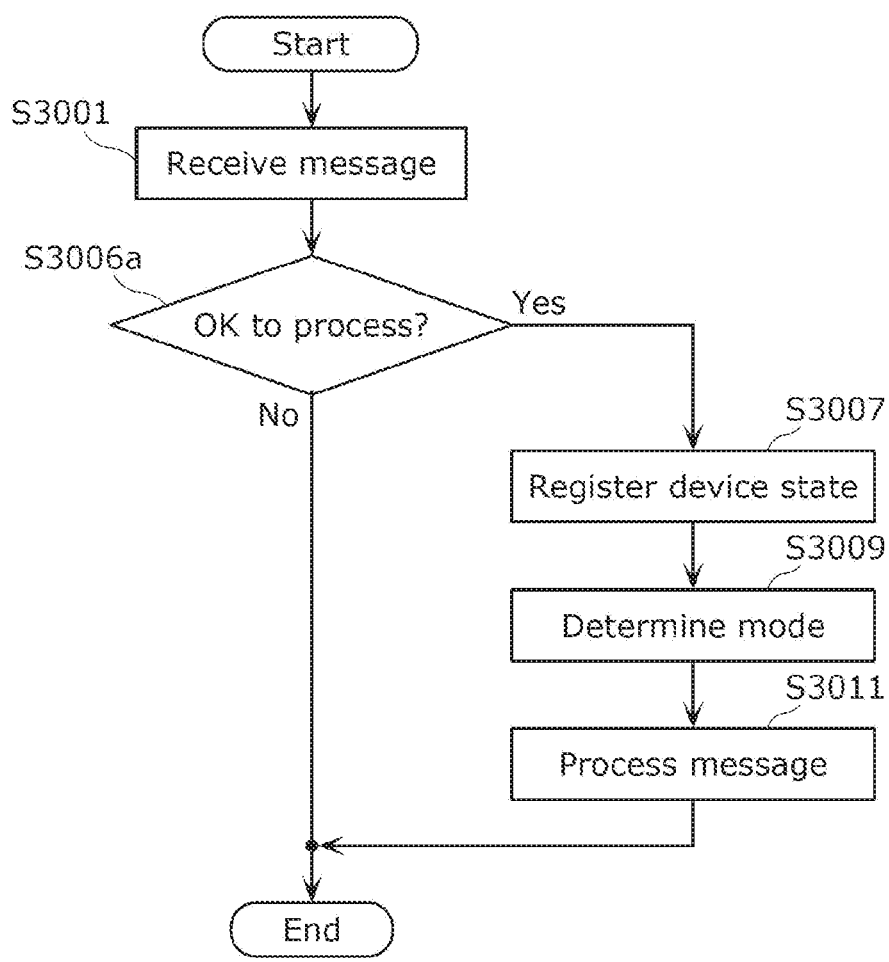
FIG. 38 is a flowchart illustrating another example of determination processing of the electric lock according to Variation 12.

The electric lock may also be configured as illustrated in FIG. 37. FIG. 37 is a block diagram illustrating another example of the configuration of electric lock 40*b* according to Variation 12 on the foregoing embodiments. FIG. 38 is a flowchart illustrating another example of determination processing of electric lock 40*b* according to Variation 12 on the foregoing embodiments.

As illustrated in FIG. 37, as the configuration of electric lock 40*b*, mode determiner 170 and mode holder 220 may be added to the configuration of electric lock 40*a* illustrated in FIG. 35. The determination processing in this configuration is as illustrated in FIG. 38. The processing for determining the mode (step S3009) is the same as in the foregoing embodiments and will therefore not be described.

Through this, unauthorized communication in the appliance or the residential equipment itself can be detected.

Note that the configurations in FIGS. 35 and 37, and the determination processing in FIGS. 36 and 38, are merely examples, and may be combined with constituent elements or processing included in Embodiment 1, Embodiment 2, and the other variations.

(15) Although the foregoing embodiments described registering "appliance" and "non-appliance" as device types, the configuration is not limited thereto. When a plurality of communication protocols for controlling appliances are present within home network 11, the device type may be registered as, for example, a device of protocol 1, a device of protocol 2, or another device; and forwarding determiner 150 may determine to forward when the transmission origin device type and the transmission destination device type are the same, and determine not to transmit when the transmission origin device type and the transmission destination device type are different.

(16) Although the foregoing embodiments described configurations in which appliances, a PC, and the like are connected to home network 11, the configuration is not limited thereto. The configuration may be such that a control device and a PC are connected to a factory network, or a building facility device, a management apparatus, and a PC are connected to a building network, or various types of electronic control units are connected to an in-vehicle network. Any configuration can be employed as long as a plurality of devices are connected to a network that is restricted to a certain space, and communication is performed to control those devices.

(17) Although the foregoing embodiments simply mentioned home network 11, these may be connected by Ethernet (registered trademark), Controller Area Network (CAN; registered trademark), or another type of wired communication, or by Bluetooth (registered trademark), Wi-Fi (registered trademark), ZigBEE (registered trademark), Z-Wave (registered trademark), or another type of wireless communication, or by a combination thereof, and are independent of the communication method. Additionally, the communication method itself may include a protocol for controlling appliances (including residential equipment), or may be a combination of a desired communication method and a desired protocol, such as Ethernet as the communication method and ECHONET Lite as the protocol. Proprietary communication methods and proprietary protocols may also be combined with existing communication methods and existing protocols.

Additionally, home network 11 is not limited to being in a home. For example, the system may be any system in which a plurality of devices are connected over a network in a building, a factory, a vehicle, or a structure, and state notifications, device control, and the like are performed over the network, and the system can be applied to any communication method or protocol employed in the respective networks.

This makes it possible to detect unauthorized messages sent and received not only in a house, but also in a building, a factory, a vehicle, or any desired structure.

(18) Each device in the foregoing embodiments is specifically a computer system constituted by a microprocessor, ROM (Read Only Memory), RAM (Random Access Memory), a hard disk unit, a display unit, a keyboard, a mouse, and the like. A computer program is recorded in the RAM or hard disk unit. Each device realizes the functions thereof by the microprocessor operating in accordance with the computer program. Here, the computer program is constituted by a combination of a plurality of command codes that indicate commands made to a computer to achieve a predetermined function.

(19) Some or all of the constituent elements constituting the devices in the foregoing embodiments may be implemented by a single integrated circuit through system LSI (Large-Scale Integration). "System LSI" refers to very-large-scale integration in which multiple constituent elements are integrated on a single chip, and specifically, refers to a computer system configured including a microprocessor, ROM, RAM, and the like. A computer program is recorded in the RAM. The system LSI circuit realizes the functions thereof by the microprocessor operating in accordance with the computer program.

The parts of the constituent elements constituting the foregoing devices may be implemented individually as single chips, or may be implemented with a single chip including some or all of the devices.

Although the term "system LSI" is used here, other names, such as IC (Integrated Circuit), LSI, super LSI, ultra LSI, and so on may be used, depending on the level of integration. Further, the manner in which the circuit integration is achieved is not limited to LSIs, and it is also possible to use a dedicated circuit or a general purpose processor. An FPGA (Field Programmable Gate Array) capable of post-production programming or a reconfigurable processor in which the connections and settings of the circuit cells within the LSI can be reconfigured may be used as well.

Further, if other technologies that improve upon or are derived from semiconductor technology enable integration technology to replace LSI circuits, then naturally it is also possible to integrate the function blocks using that technology. Biotechnology applications are one such foreseeable example.

(20) Some or all of the constituent elements constituting the foregoing devices may be constituted by IC cards or stand-alone modules that can be removed from and mounted in the apparatus. The IC card or module is a computer system constituted by a microprocessor, ROM, RAM, and the like. The IC card or module may include the above very-large-scale integration LSI circuit. The IC card or module realizes the functions thereof by the microprocessor operating in accordance with the computer program. The IC card or module may be tamper-resistant.

(21) The present disclosure may be realized by the methods described above. This may be a computer program that implements these methods on a computer, or a digital signal constituting the computer program.

Additionally, the present disclosure may also be computer programs or digital signals recorded in a computer-readable recording medium such as a flexible disk, a hard disk, a CD-ROM, an MO, a DVD, a DVD-ROM, a DVD-RAM, a BD (Blu-ray (registered trademark) Disc), semiconductor memory, or the like. The constituent elements may also be the digital signals recorded in such a recording medium.

Additionally, the present disclosure may be realized by transmitting the computer program or digital signal via a telecommunication line, a wireless or wired communication line, a network such as the Internet, a data broadcast, or the like.

Additionally, the present disclosure may be a computer system including a microprocessor and memory, where the memory records the above-described computer program and the microprocessor operates in accordance with the computer program.

Additionally, the present disclosure may be implemented by another independent computer system, by recording the program or the digital signal in the recording medium and transferring the recording medium, or by transferring the program or the digital signal over the network or the like.

(22) Additionally, the divisions of the function blocks in the block diagrams are merely examples, and a plurality of function blocks may be realized as a single function block, a single function block may be divided into a plurality of function blocks, or some functions may be transferred to other function blocks. Additionally, the functions of a plurality of function blocks having similar functions may be processed by a single instance of hardware or software, in parallel or time-divided.

(23) Additionally, the orders of the processes described in the flowcharts of the foregoing embodiments and the like are merely examples. The order of multiple processes may be changed, and multiple processes may be executed in parallel.

(24) The above-described embodiments and variations may be combined as well.

Additionally, these techniques can be realized as a method that includes some or all of the steps of processing executed by each constituent element in each of the foregoing embodiments or variations thereon, or as a program that is executed by a processor of an unauthorized communication detection system to cause the unauthorized communication detection system to implement the method. For example, processing executed by a specific constituent element in the foregoing embodiments or variations thereon may be executed by a different constituent element instead of the specific constituent element. Additionally, the order of multiple processes may be changed, and multiple processes may be executed in parallel.

INDUSTRIAL APPLICABILITY

The present disclosure is useful in, for example, communication networks in which appliances and devices aside from appliances are connected.

The invention claimed is:

1. An unauthorized communication detection method that detects an unauthorized communication message on an in-facility network over which at least two devices including a first device and a second device are communicably connected to each other, the unauthorized communication detection method comprising:
receiving, from the first device, a communication message transmitted from the first device to the second device;
obtaining, when the communication message is received from the first device, first information indicating at least one from among (a) a state of a person in a facility and a state of at least one of the at least two devices or (b) states of the at least two devices;
determining whether the communication message received from the first device is a communication message that is unauthorized based on the first information when the communication message includes a device control command that controls the second device;
when the communication message is determined to be unauthorized, then determining to not execute processing pertaining to the device control command, and when the communication message is determined to be authorized, then determining to execute the processing pertaining to the device control command; and executing the processing pertaining to the device control command when the determining determines to execute the processing.

2. The unauthorized communication detection method according to claim 1,
wherein the in-facility network further includes a relay device that relays the communication message that is transmitted and received between the at least two devices, the relay device executing the unauthorized communication detection method,
the processing pertaining to the device control command is processing of transmitting the communication message including the device control command to the second device,
wherein when the communication message is determined to be unauthorized, then determining to not transmit the communication message including the device control command to the second device, and when the communication message is determined to be authorized, then determining to transmit the communication message including the device control command to the second device, and
the executing includes transmitting the communication message to the second device as the executing of the processing.

3. The unauthorized communication detection method according to claim 2, wherein the first information includes the state of a person in the facility, and
the determining includes determining to transmit the communication message including the device control command to the second device when, based on the first information, a person is determined to be present in the facility, and determining to not transmit the communication message including the device control command to the second device when, based on the first information, a person is determined to not be present in the facility.

4. The unauthorized communication detection method according to claim 2,
wherein the second device is installed in an entrance of the facility, and the determining further includes determining to transmit the communication message including the device control command to the second device when, based on the first information, a person is determined to be present only near the entrance of the facility.

5. The unauthorized communication detection method according to claim 2, further comprising:
determining a forwarding determination mode of the relay device based on the first information, the forwarding determination mode indicating whether or not a person is in the facility,
wherein the determining whether to execute processing further includes determining to transmit the communication message including the device control command to the second device based on the forwarding determination mode of the relay device determined in the determining of a forwarding determination mode.

6. The unauthorized communication detection method according to claim 5,
wherein the determining of a forwarding determination mode includes determining the forwarding determination mode to be an active mode when, based on the first information, a person is determined to be in the facility, and determining the forwarding determination mode to be an away mode when, based on the first information, a person is determined to not be in the facility, and
the determining whether to execute processing includes determining to transmit the device control command to the second device when the forwarding determination mode is the active mode, and determining not to transmit the device control command to the second device when the forwarding determination mode is the away mode.

7. The unauthorized communication detection method according to claim 6,
wherein the forwarding determination mode further includes a non-active mode, and
the determining of a forwarding determination mode includes determining the forwarding determination mode to be the active mode when, based on the first information, a person is determined to be in the facility and the person is active, and determining the forwarding determination mode to be the non-active mode when, based on the first information, a person is determined to be in the facility and the person is not active.

8. The unauthorized communication detection method according to claim 7,
wherein the second device is an electric lock,
the device control command includes either an unlock command for unlocking the electric lock or another command aside from the unlock command, and
the determining whether to execute processing includes determining to transmit each of the unlock command and the other command to the second device when the forwarding determination mode is the active mode, determining to transmit only the other command among the unlock command and the other command to the second device when the forwarding determination mode is the non-active mode, and determining to transmit neither the unlock command nor the other command to the second device when the forwarding determination mode is the away mode.

9. The unauthorized communication detection method according to claim 8,
wherein the determining of a forwarding determination mode further includes determining the forwarding determination mode to be an entrance mode when, based on the first information, a person is determined to be present only near the entrance of the facility, and
the determining whether to execute processing includes determining not to transmit the unlock command when the forwarding determination mode is the entrance mode and the first device is a device that is not present near the entrance.

10. The unauthorized communication detection method according to claim 8,
wherein the determining of a forwarding determination mode further includes determining the forwarding determination mode to be a housesitting mode when, based on the first information, one or more people are in the facility and each person in the facility is a person not allowed to control the at least two devices over the in-facility network, and
the determining whether to execute processing includes determining to transmit only the other command among the unlock command and the other command when the forwarding determination mode is the housesitting mode.

11. The unauthorized communication detection method according to claim 1,
wherein the unauthorized communication detection method is executed by the second device,
the processing pertaining to the device control command is processing of executing the device control command included in the communication message,
the determining whether to execute processing includes, as the determining of whether to execute the processing pertaining to the device control command, determining whether the second device is to execute the device control command, and
the executing includes, as the executing of the processing, controlling an operation of the second device based on the device control command.

12. The unauthorized communication detection method according to claim 1,
wherein the second device is an electric lock, and
the device control command is an unlock command for unlocking the electric lock.

13. The unauthorized communication detection method according to claim 1, further comprising:
between the determining whether to execute processing and the executing when the processing pertaining to the device control command is determined to be executed, updating the first information based on a state of at least one of a person in the facility and the at least two devices after the processing is executed.

14. The unauthorized communication detection method according to claim 1,
wherein the determining whether to execute processing includes further determining whether to execute the processing pertaining to the device control command based on a predetermined condition when the communication message is a message including the device control command, and
the predetermined condition is that the first device is a device having a predetermined function.

15. The unauthorized communication detection method according to claim 1, wherein the facility is a residence.

16. An unauthorized communication detection device comprising a microprocessor that detects an unauthorized communication message on an in-facility network over which at least two devices including a first device and a second device are communicably connected to each other, the unauthorized communication detection device comprising:

a receiver that receives, from the first device, a communication message transmitted from the first device to the second device;
an obtainer that, when the communication message is received from the first device, obtains first information indicating at least one from among (a) a state of a person in a facility and a state of at least one of the at least two devices or (b) states of the at least two devices;
a determiner that, based on the first information, determines whether the communication message received from the first device is a communication message is unauthorized when the communication message including the device control command that controls the second device,
when the communication message is determined to be unauthorized, the determiner determines to not execute processing pertaining to the device control command, and when the communication message is determined to be authorized, the determiner determines to execute the processing pertaining to the device control command; and
an executer that executes the processing pertaining to the device control command when the processing is determined to be executed by the determiner.

17. A non-transitory computer-readable recording medium recorded thereon a program that causes a computer to execute the unauthorized communication detection method according to claim 1.

18. The unauthorized communication detection method according to claim 7, wherein the device control command includes either a specific device control command or another command aside from the specific device control command, and
the determining whether to execute processing includes determining to transmit each of the specific device control command and the other command to the second device when the forwarding determination mode is the active mode, determining to transmit only the other command among the specific device control command and the other command to the second device when the forwarding determination mode is the non-active mode, and determining to transmit neither the specific device control command nor the other command to the second device when the forwarding determination mode is the away mode.

* * * * *